US012204431B2

(12) United States Patent
Moser et al.

(10) Patent No.: US 12,204,431 B2
(45) Date of Patent: Jan. 21, 2025

(54) METHOD AND SYSTEM FOR THE ON-DEMAND GENERATION OF GRAPH-LIKE MODELS OUT OF MULTIDIMENSIONAL OBSERVATION DATA

(71) Applicant: Dynatrace LLC, Waltham, MA (US)

(72) Inventors: Herwig Moser, Freistadt (AT); Martin Carpella, Katsdorf (AT); Otmar Ertl, Linz (AT)

(73) Assignee: Dynatrace LLC, Waltham, MA (US)

( * ) Notice: Subject to any disclaimer, the term of this patent is extended or adjusted under 35 U.S.C. 154(b) by 447 days.

(21) Appl. No.: 17/733,105

(22) Filed: Apr. 29, 2022

(65) Prior Publication Data

US 2022/0358023 A1 Nov. 10, 2022

Related U.S. Application Data

(60) Provisional application No. 63/185,703, filed on May 7, 2021.

(51) Int. Cl.
*G06F 11/34* (2006.01)
*G06F 11/30* (2006.01)
*G06F 16/28* (2019.01)

(52) U.S. Cl.
CPC ...... *G06F 11/3409* (2013.01); *G06F 11/3006* (2013.01); *G06F 16/288* (2019.01); *G06F 2201/835* (2013.01)

(58) Field of Classification Search
None
See application file for complete search history.

(56) References Cited

U.S. PATENT DOCUMENTS

| 8,051,162 | B2* | 11/2011 | Arlitt | H04L 41/5009 |
| | | | | 702/182 |
| 10,659,310 | B1* | 5/2020 | Oren | H04L 41/0803 |
| 11,159,599 | B2 | 10/2021 | Greifeneder et al. | |
| 12,026,718 | B1* | 7/2024 | Rahmaniani | G06Q 20/405 |

(Continued)

OTHER PUBLICATIONS

Extended European Search Report from counterpart EP Application No. 221717655, dated Sep. 23, 2022.

*Primary Examiner* — Mohamed Ibrahim
(74) *Attorney, Agent, or Firm* — Harness, Dickey & Pierce, P.L.C.

(57) ABSTRACT

Technologies are disclosed for the automated, rule-based generation of models from arbitrary, semi-structured observation data. Context data of received observation data, like data describing the location of on which a phenomenon was observed, is used to identify related observations, to generate entities in a model describing the observed data and to assign observations to model data. Mapping rules may be used for the on-demand generation of models, and different sets of mapping rules may be used to generate different models out of the same observation data for different purposes. Further, observation time data may be used to observer the temporal evolution of the generated model. Possible use cases of the so generated models include the interpretation of observation data that describes unexpected operation conditions in view of the generated model, or to determine how a monitored system reacts on changing conditions, like increased load.

22 Claims, 19 Drawing Sheets

Conceptual/Data Flow Overview

(56) References Cited

U.S. PATENT DOCUMENTS

| | | | |
|---|---|---|---|
| 2009/0222549 A1* | 9/2009 | Gilbert | G06F 11/3495 |
| | | | 709/224 |
| 2012/0185736 A1 | 7/2012 | Sambamurthy et al. | |
| 2013/0091266 A1* | 4/2013 | Bhave | G06F 11/3006 |
| | | | 709/224 |
| 2016/0277257 A1* | 9/2016 | Addleman | G06F 11/3447 |
| 2019/0266502 A1 | 8/2019 | Moser et al. | |
| 2020/0042426 A1 | 2/2020 | Ambichl et al. | |
| 2022/0413992 A1* | 12/2022 | Nguyen | G06F 11/3428 |

* cited by examiner

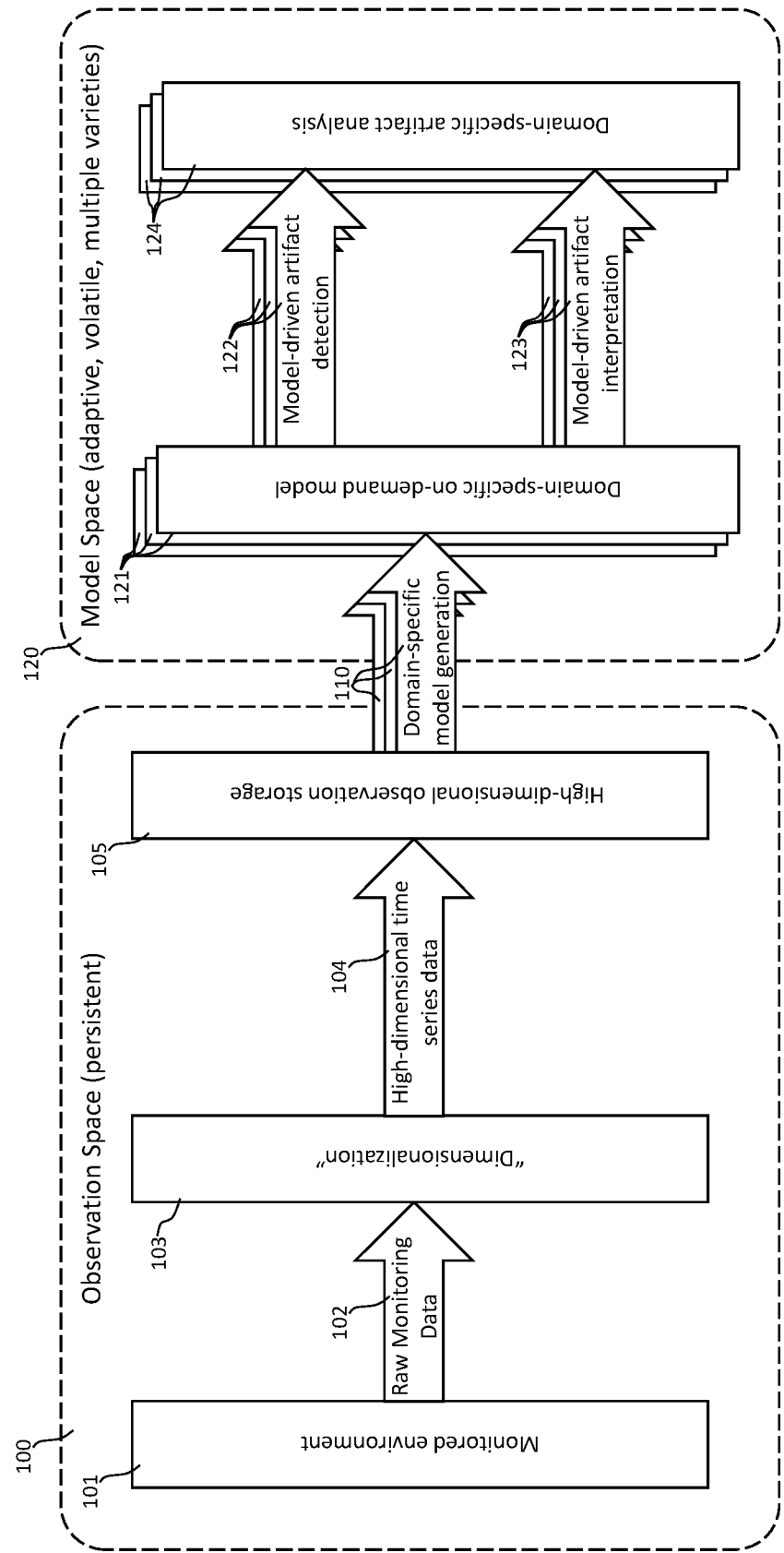
FIG 1: Conceptual/Data Flow Overview

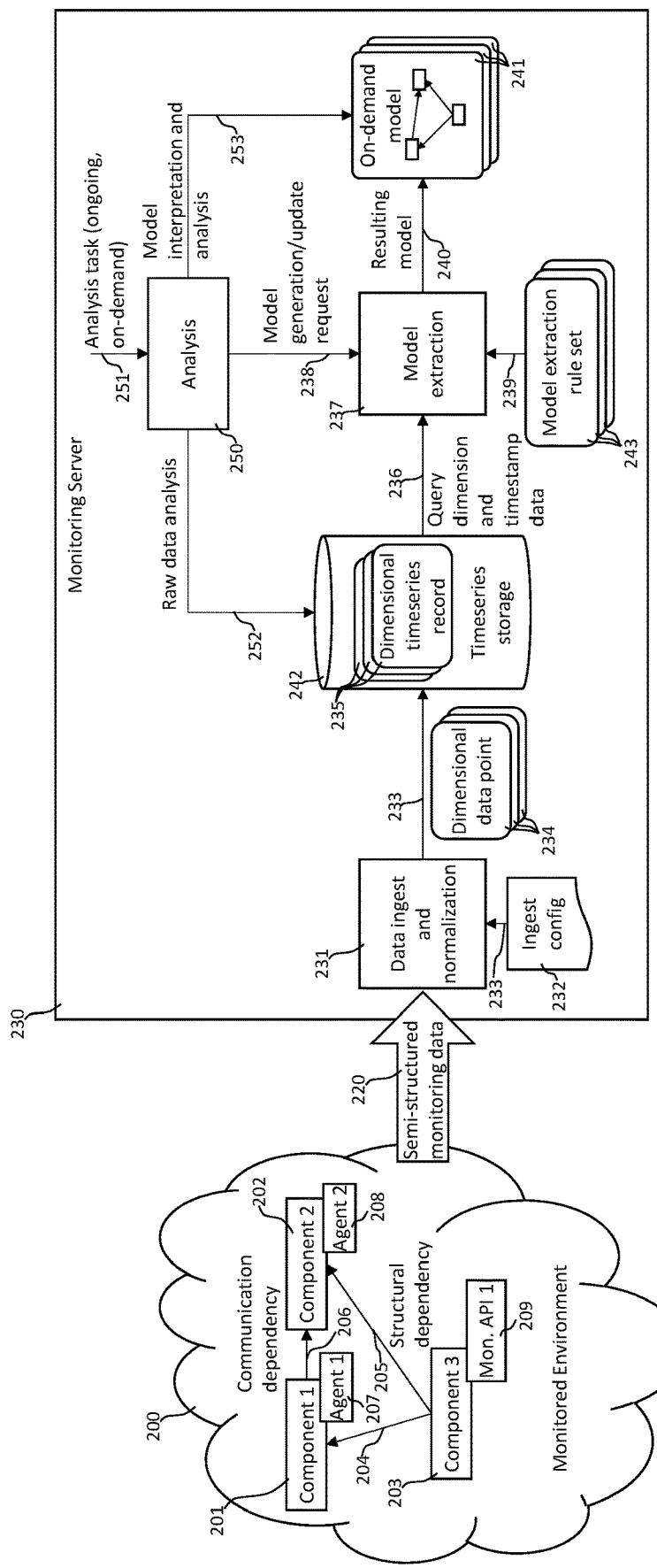
FIG 2: Architectural Overview

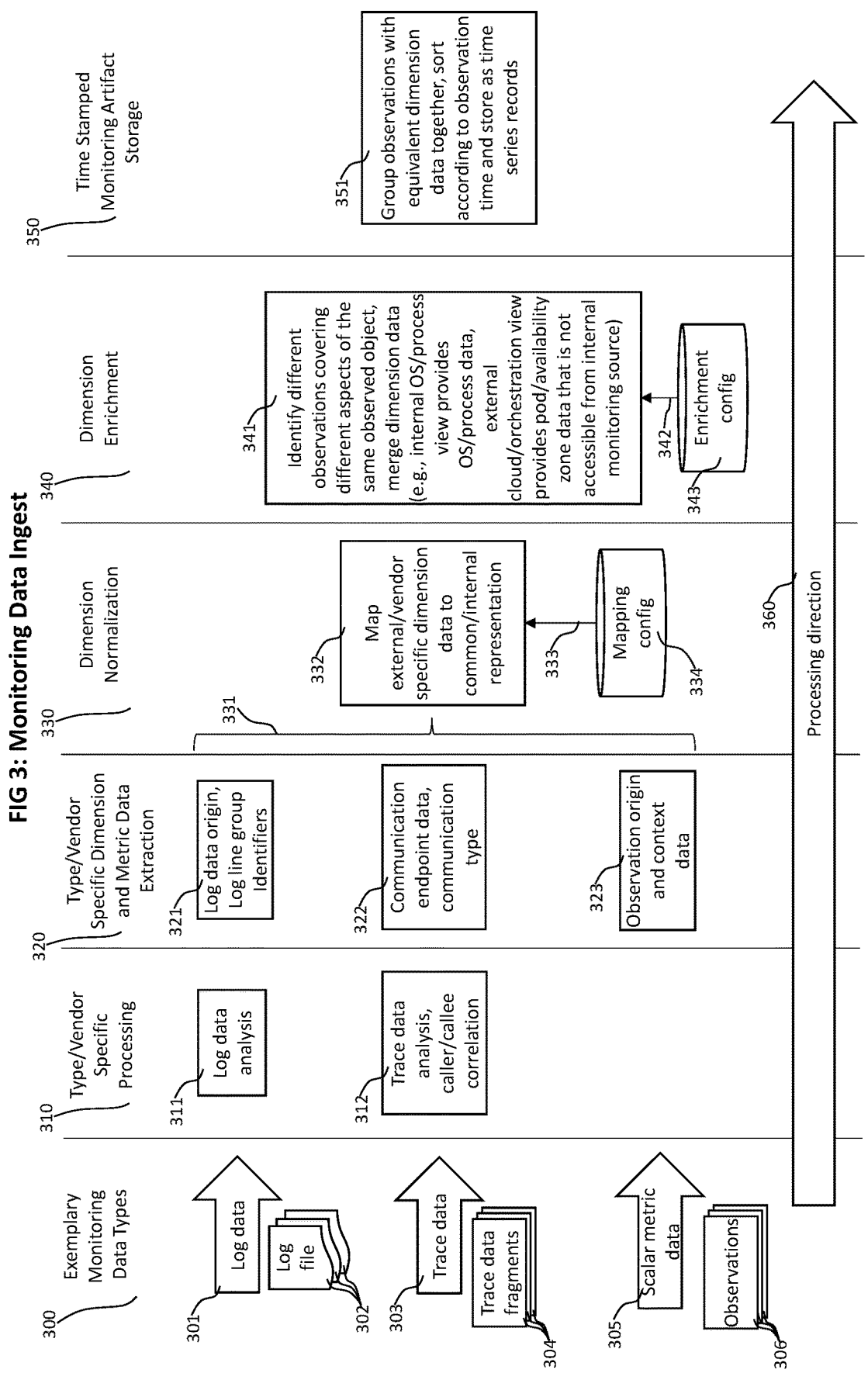
FIG 3: Monitoring Data Ingest

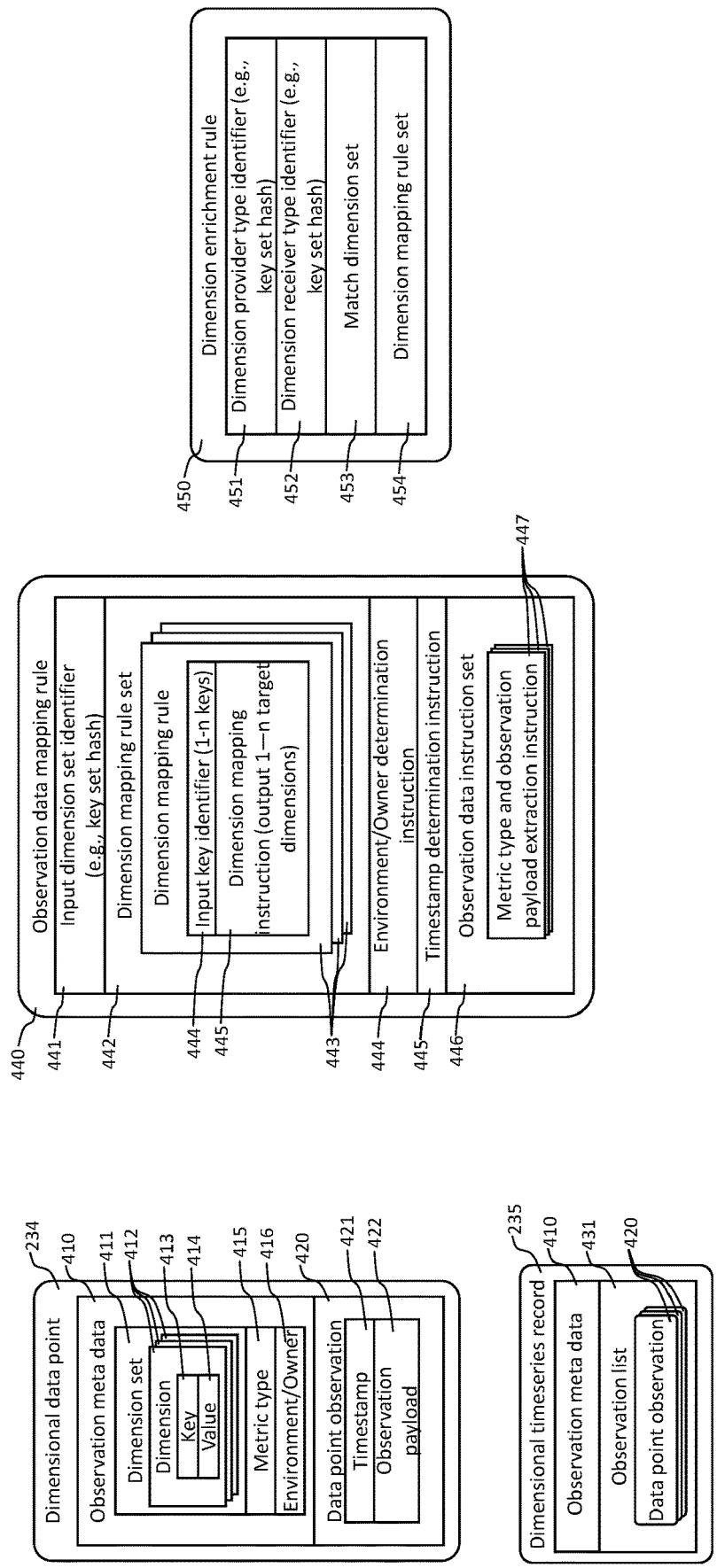
FIG 4: Monitoring Data Ingest Rules and Monitoring Data Storage Records

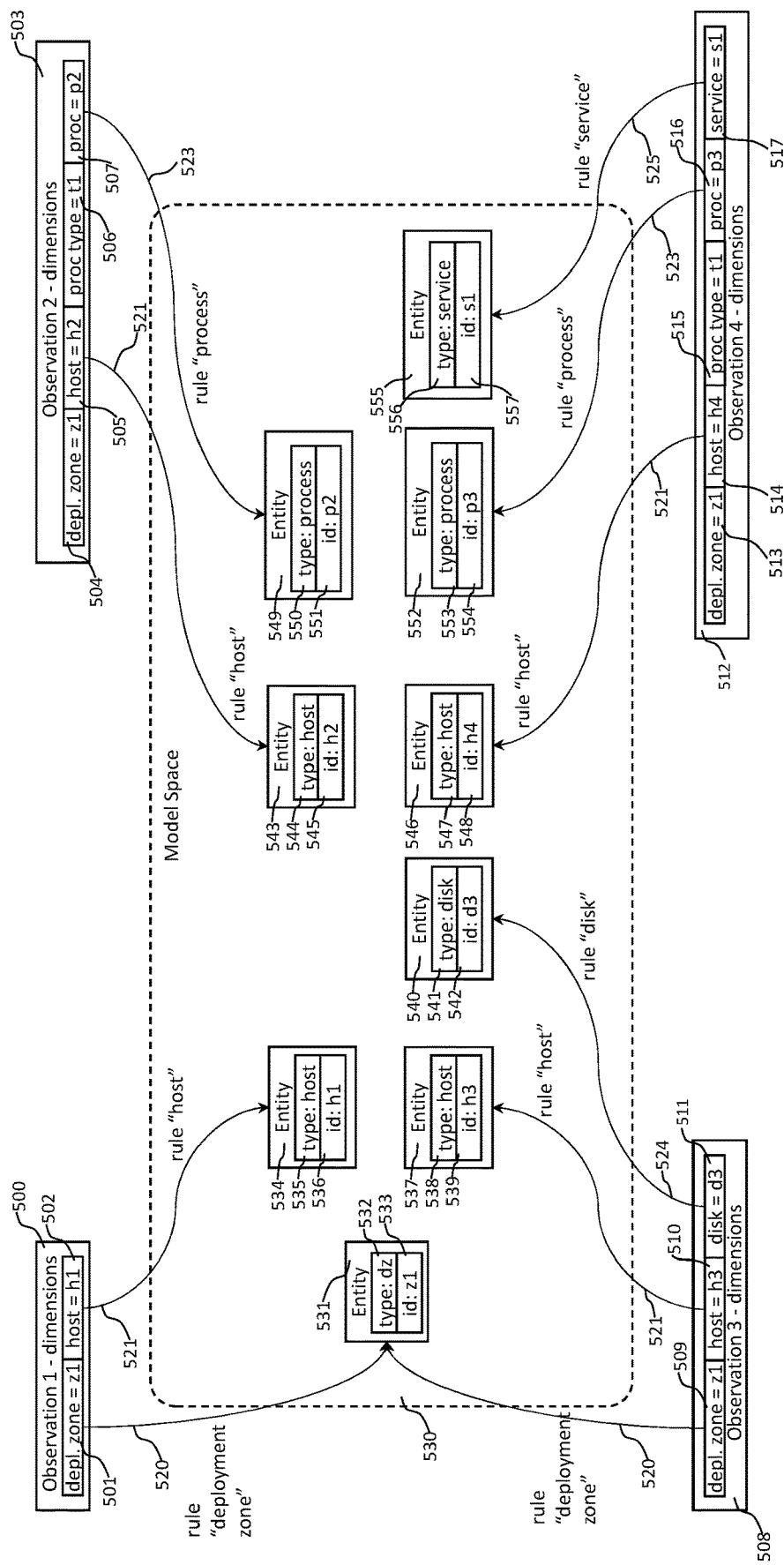
FIG 5: Exemplary Entity Mappings

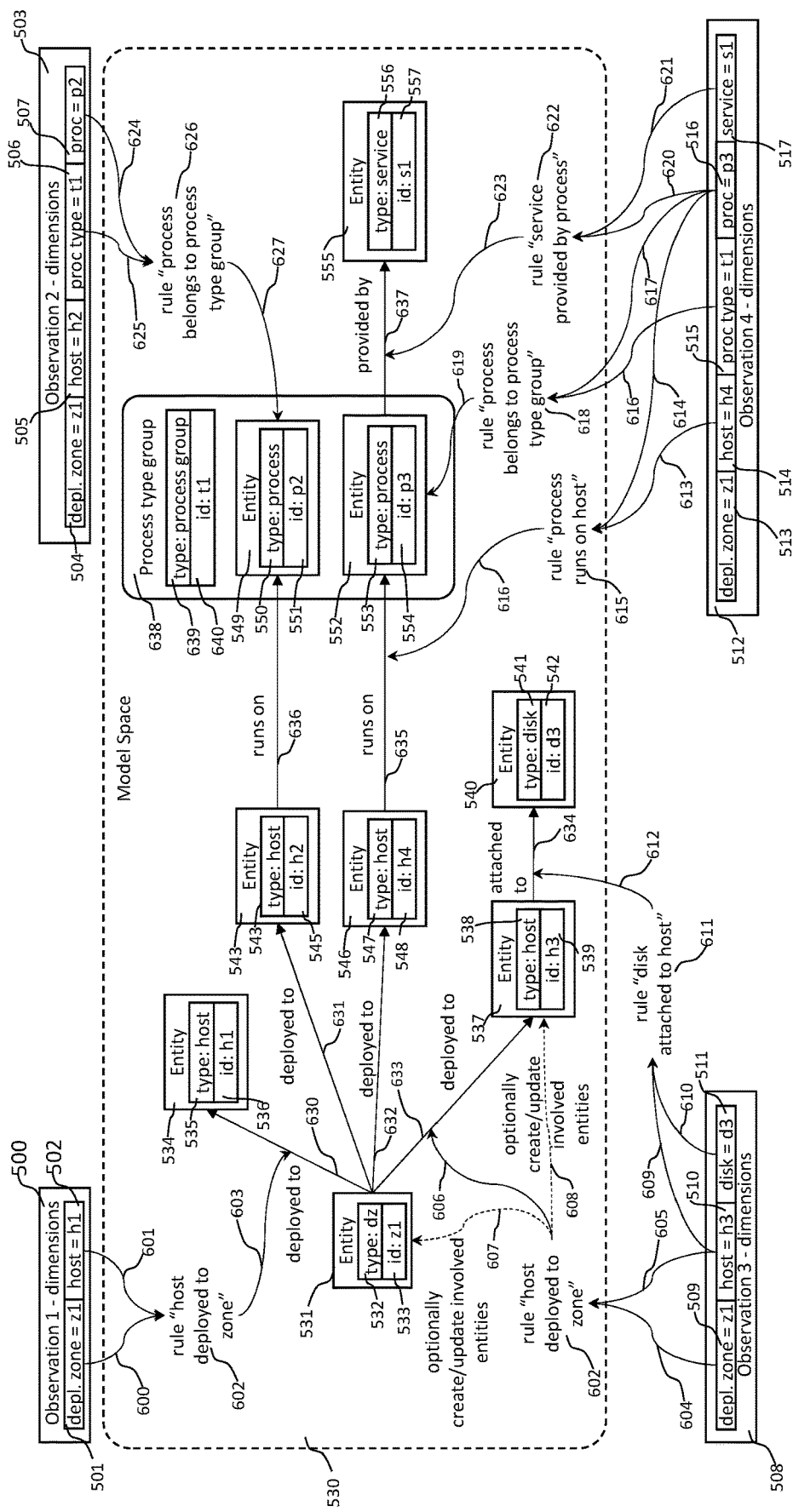
FIG 6: Exemplary Structural Relationship Mappings

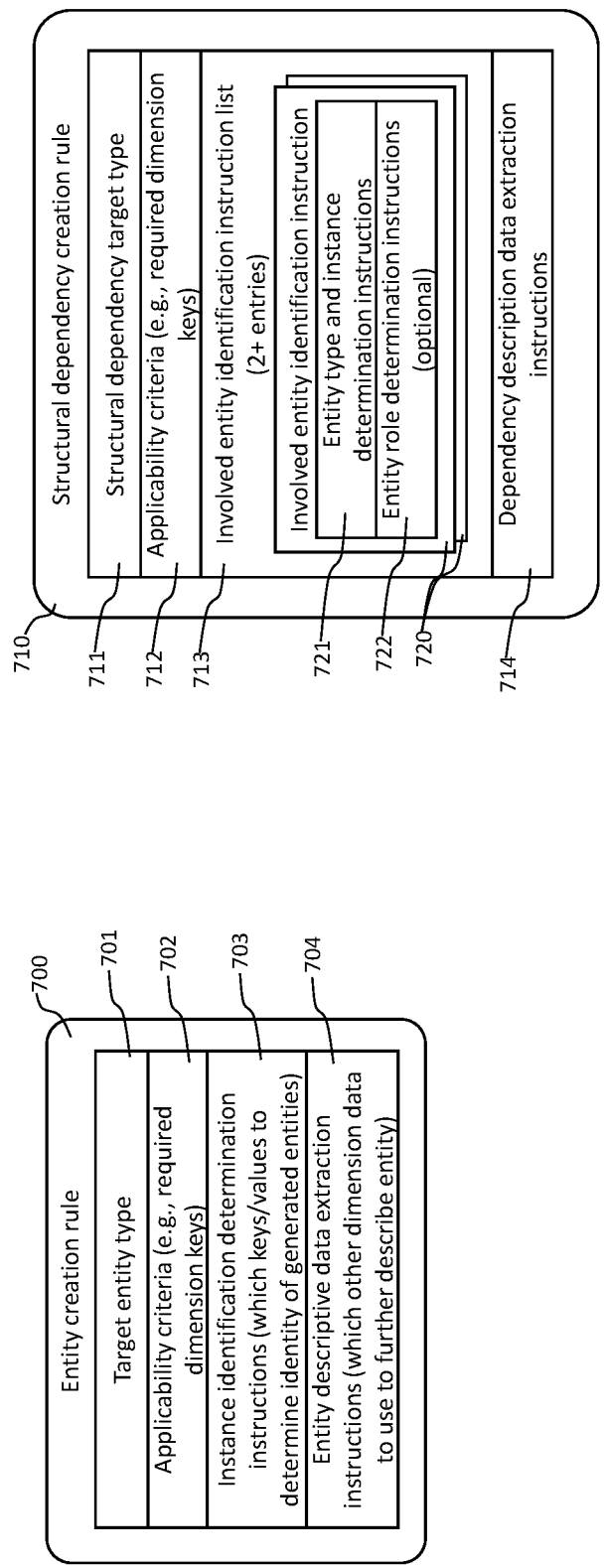
FIG 7: Entity and Structural Dependency Identification Rules

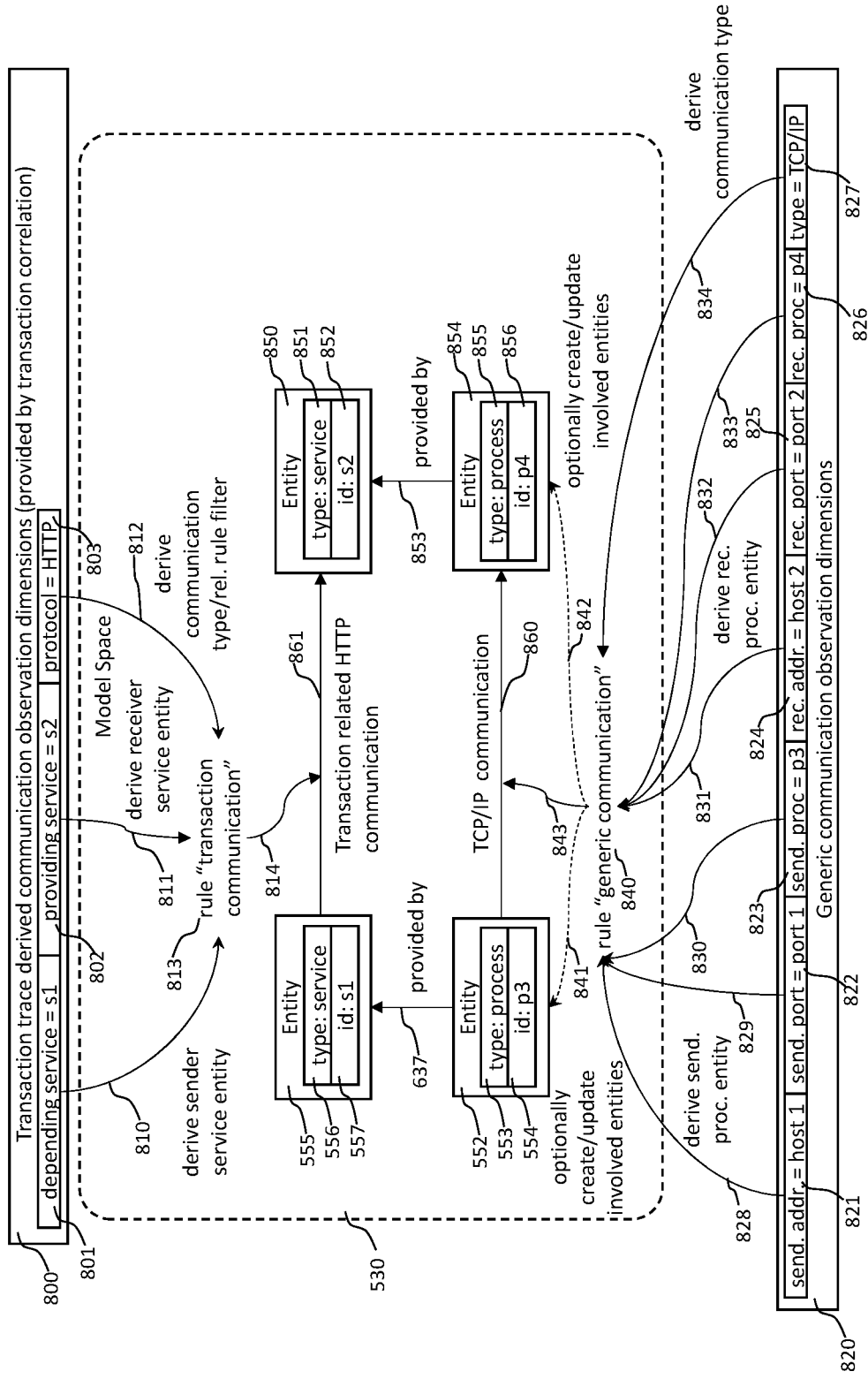
FIG 8: Exemplary Communication Relationship Mappings

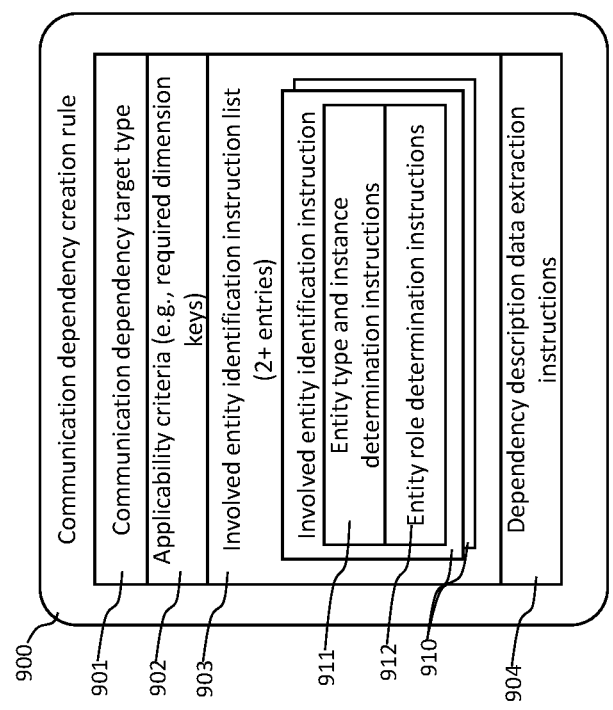
FIG 9: Communication Relationship Identification Rule

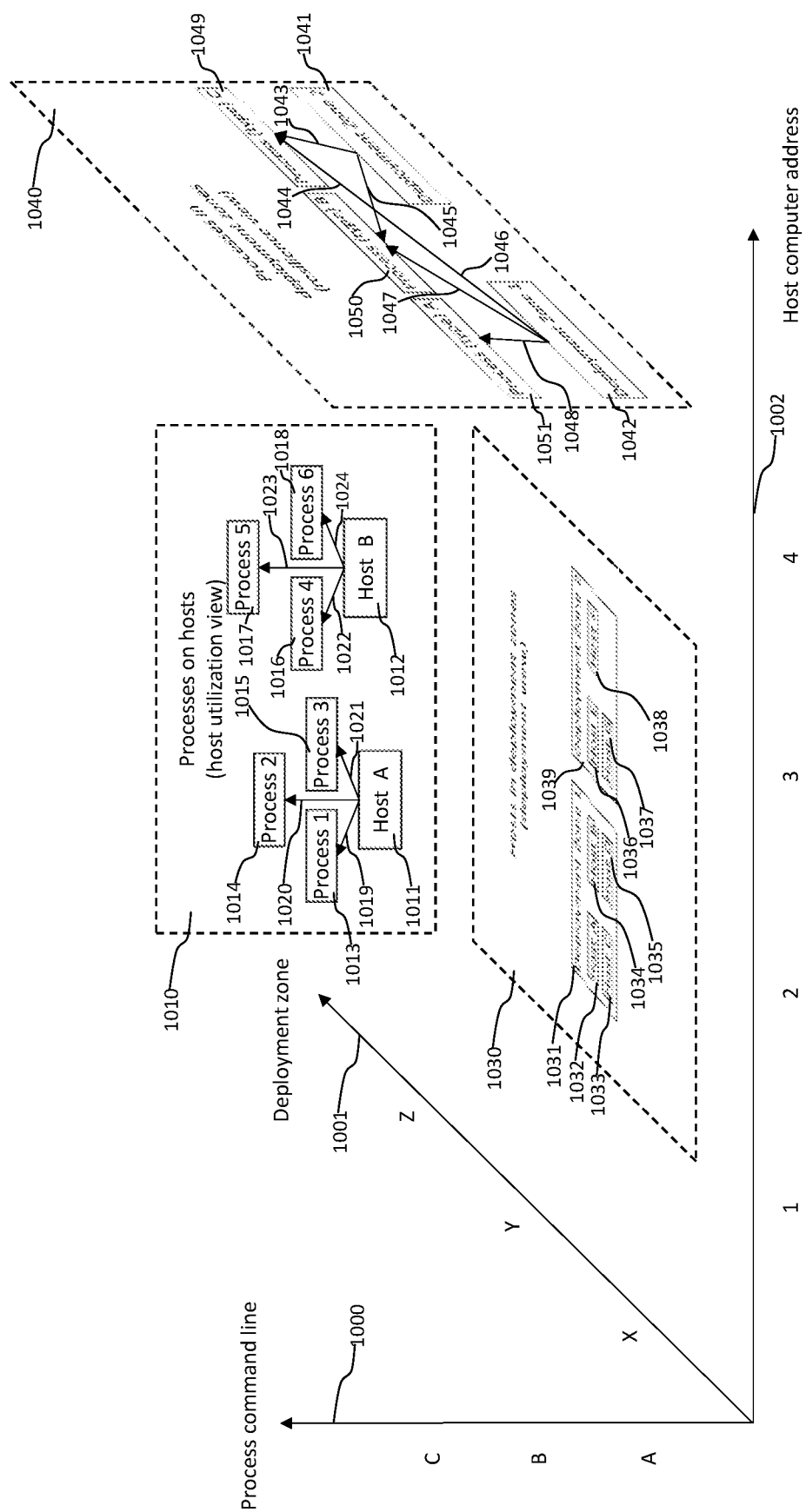
FIG 10: Simplified Exemplary Model Mappings

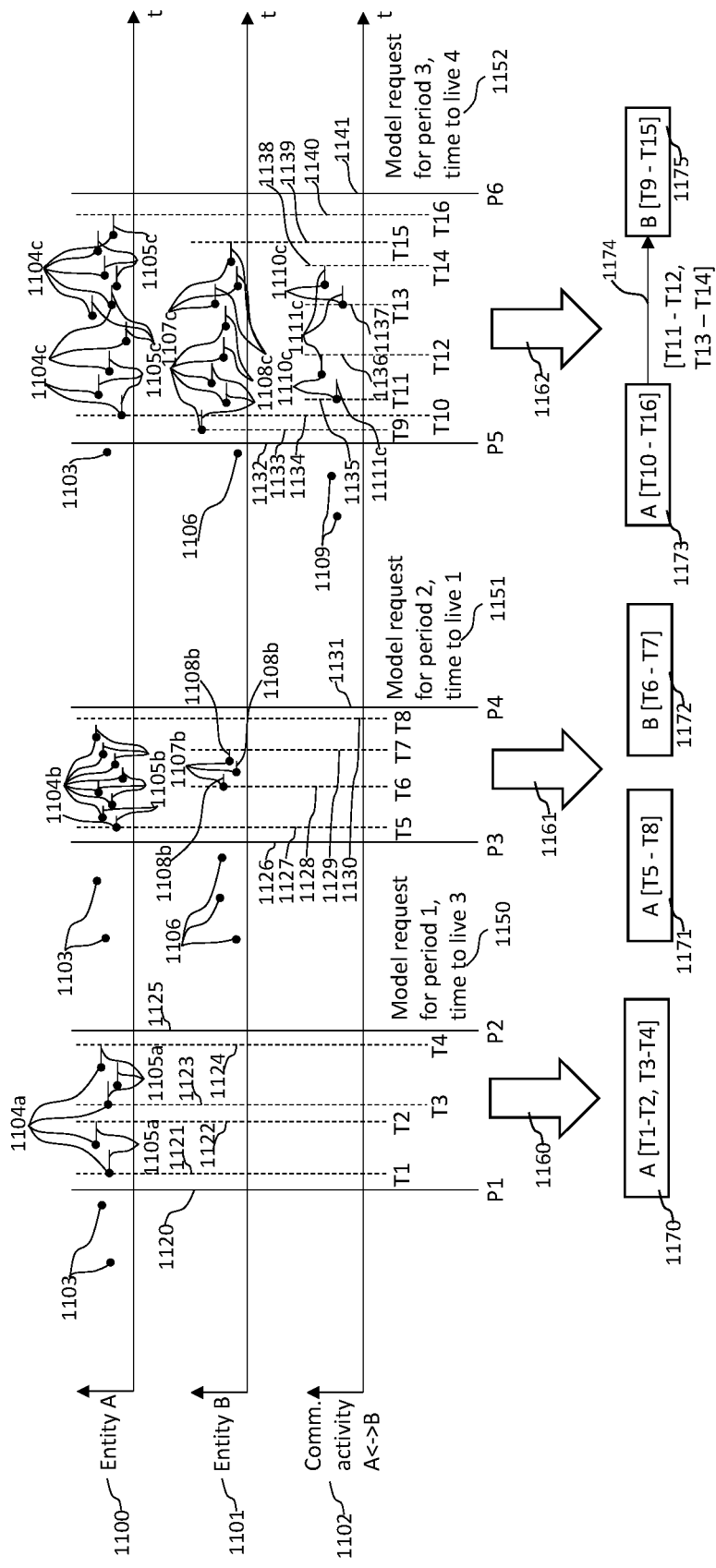
FIG 11: Time Constrained Model Generation

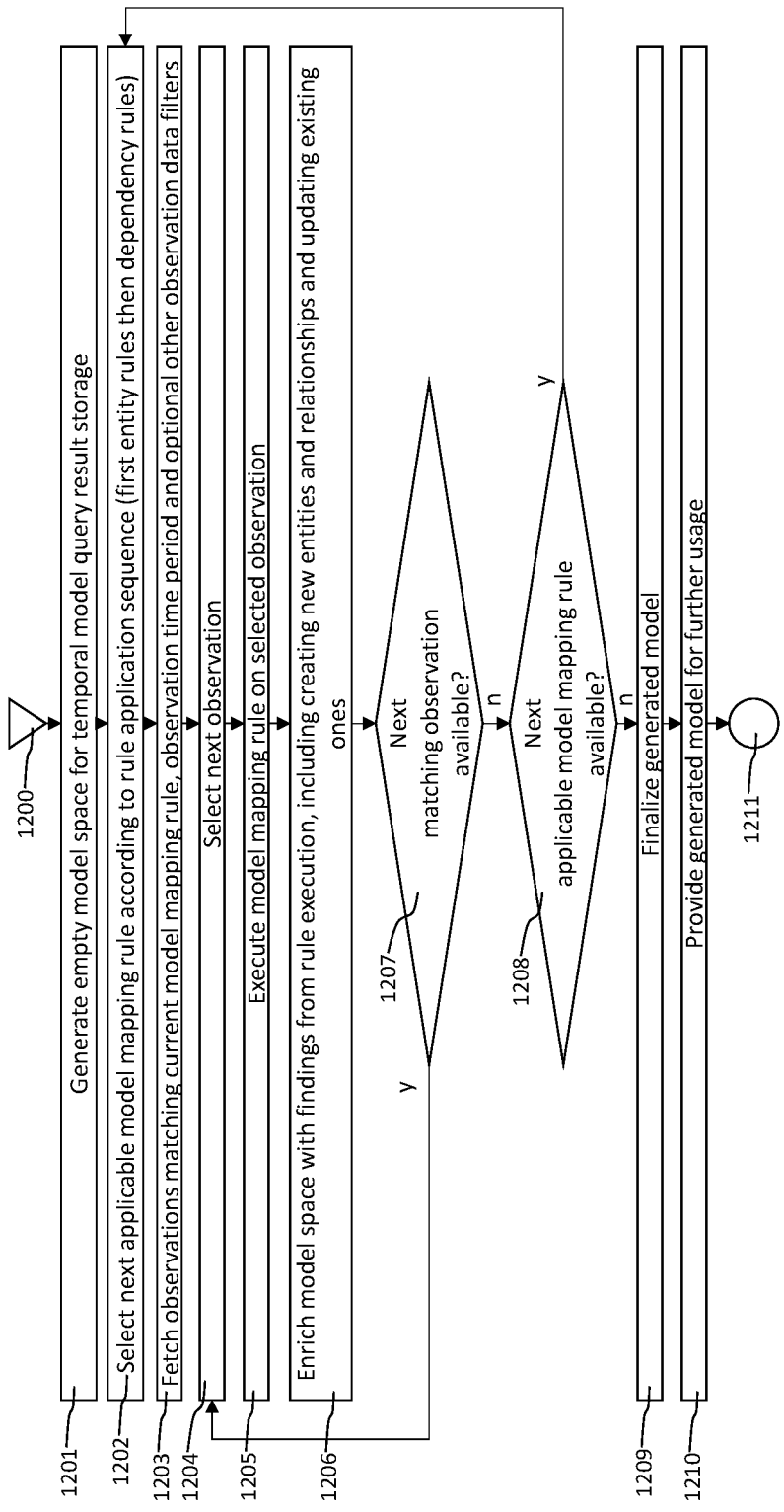
FIG 12: Conceptual Model Generation Process

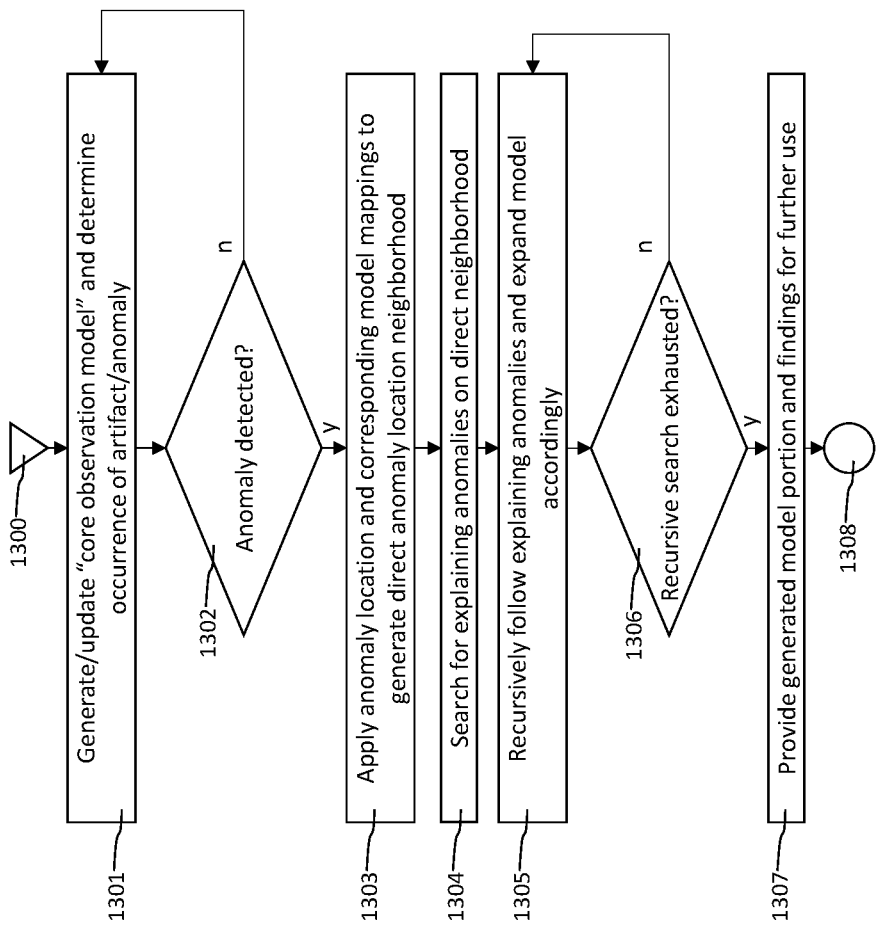
FIG 13: Interleaved Model Generation and Analysis

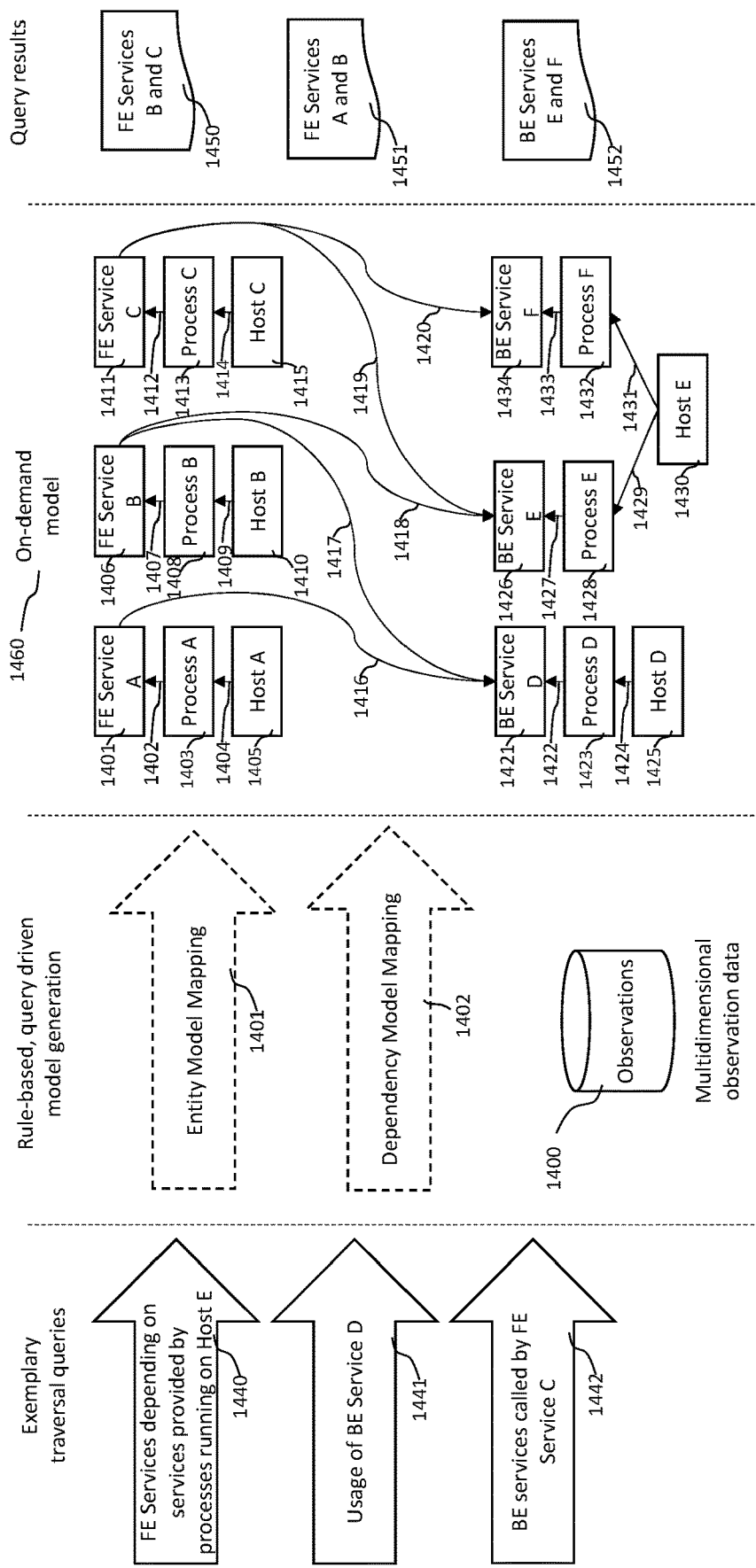
FIG 14: Model Traversal Query Examples

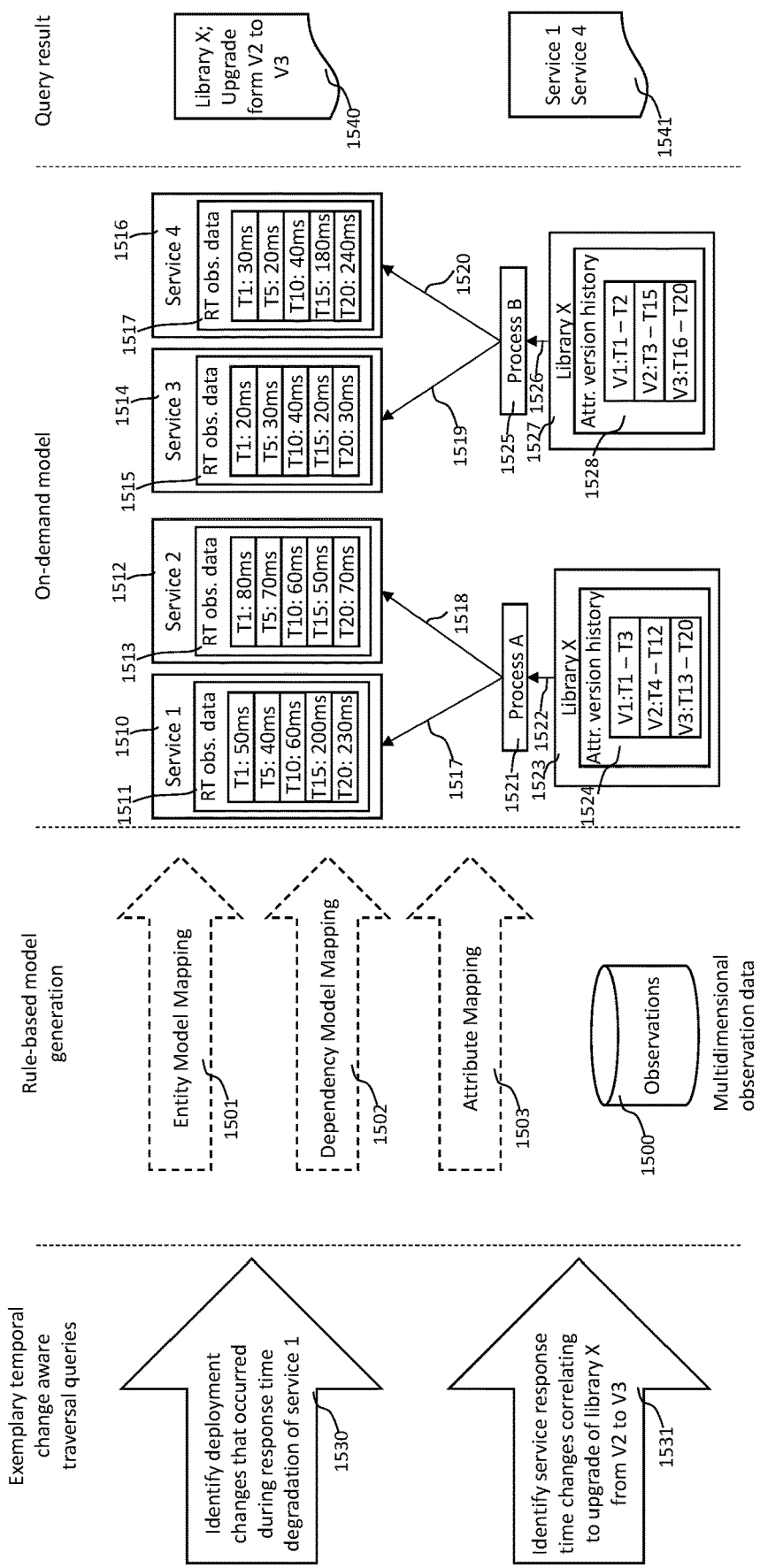
FIG 15: Model Traversal Query Example Considering Temporal Aspects

FIG 16: Model Traversal Query Structure
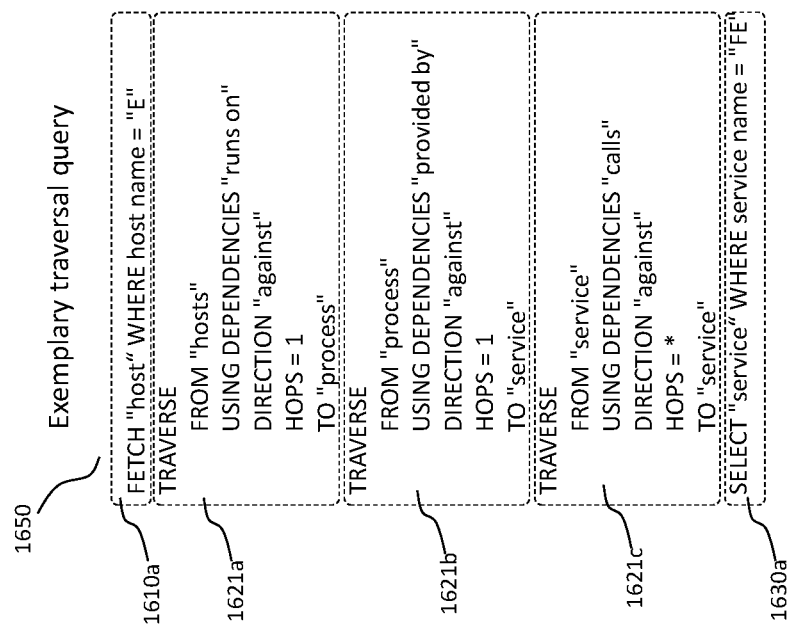
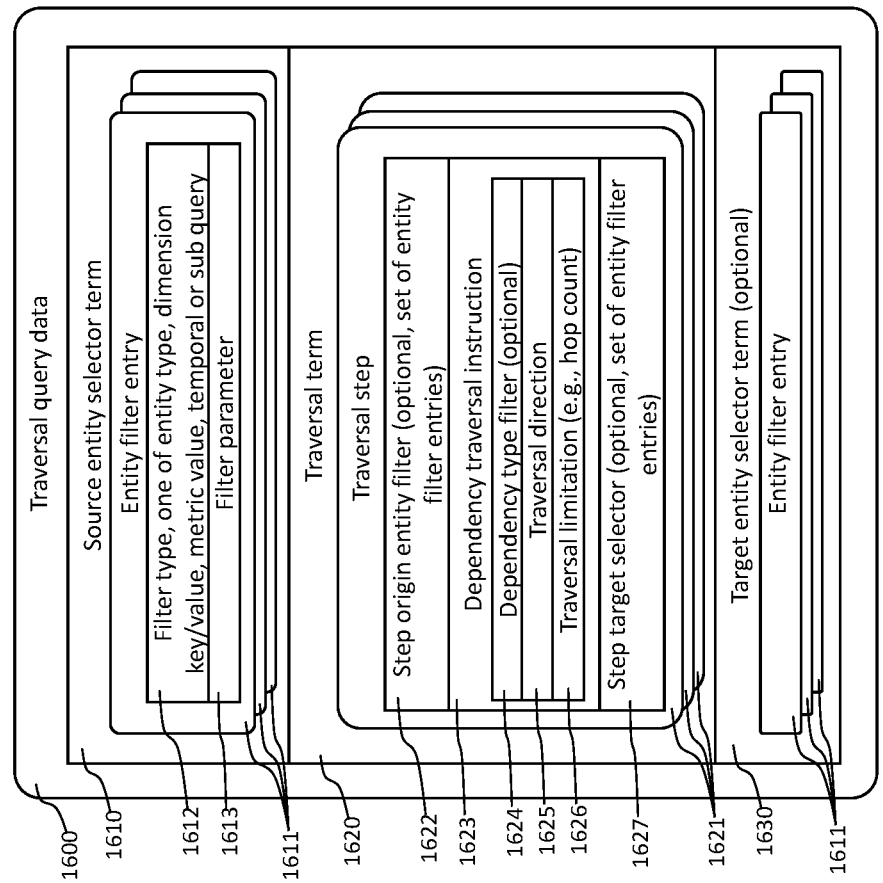

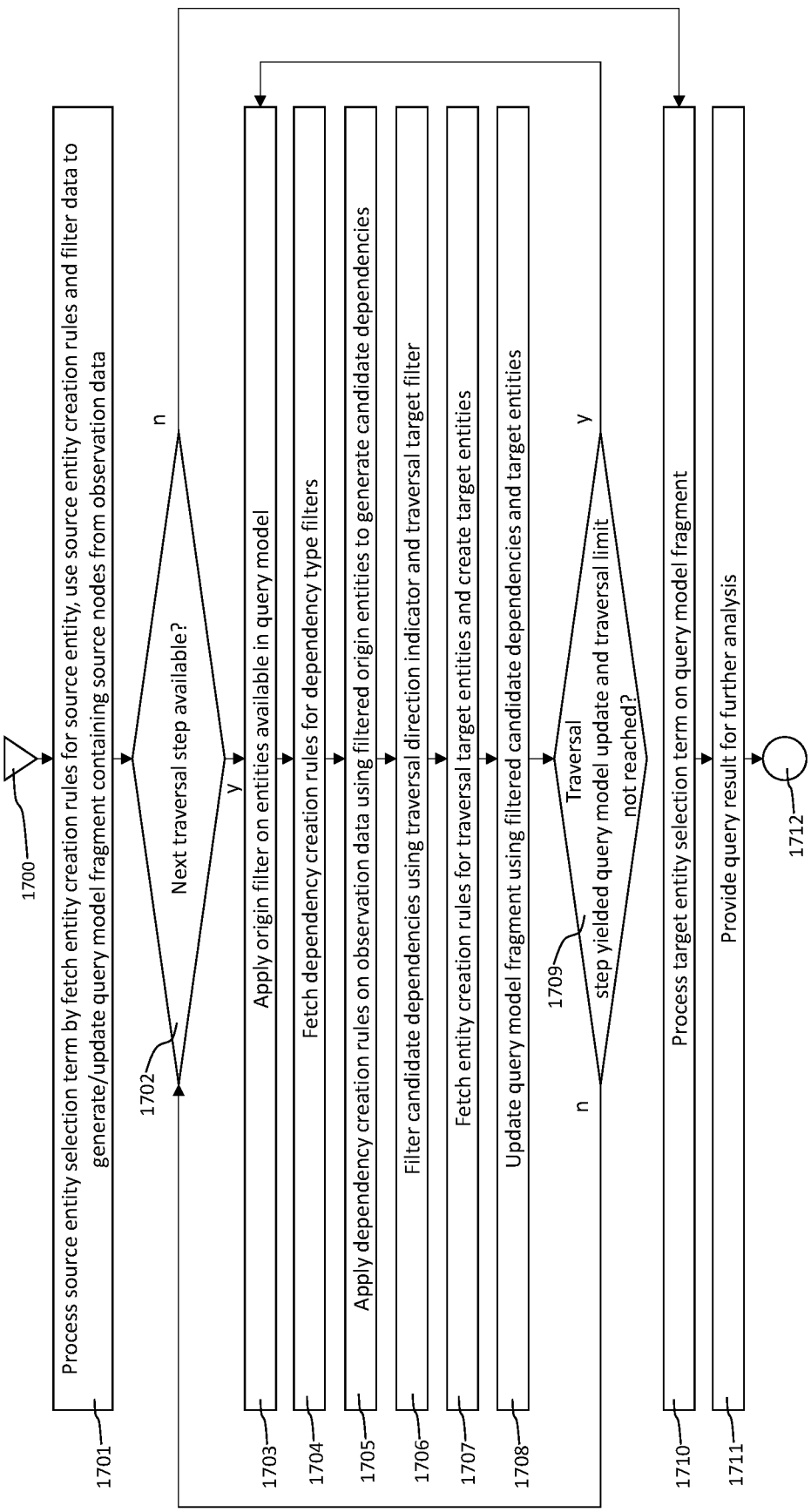

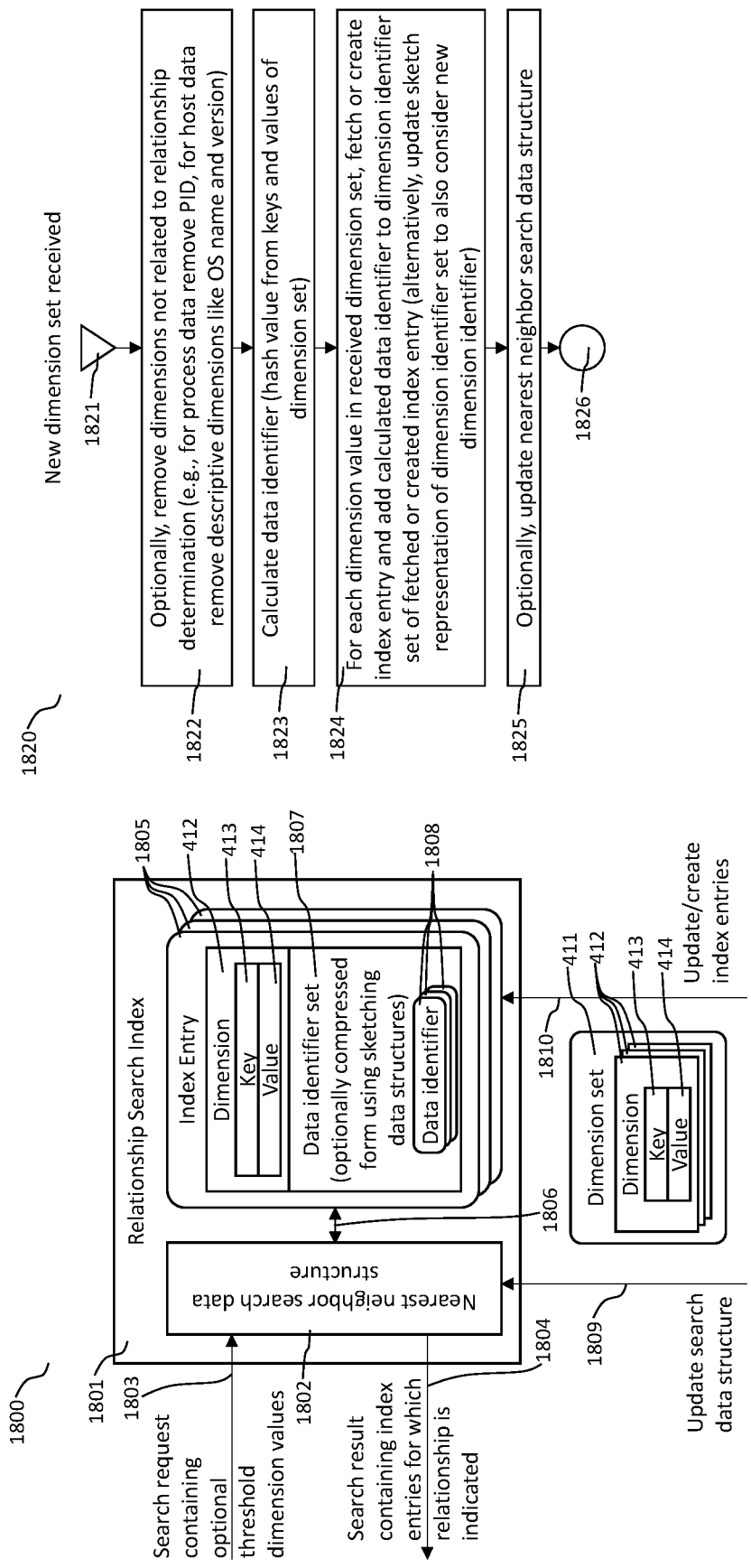
FIG 18: Automatic Identification of Vertical Relationships – Search Index Structure and Creation

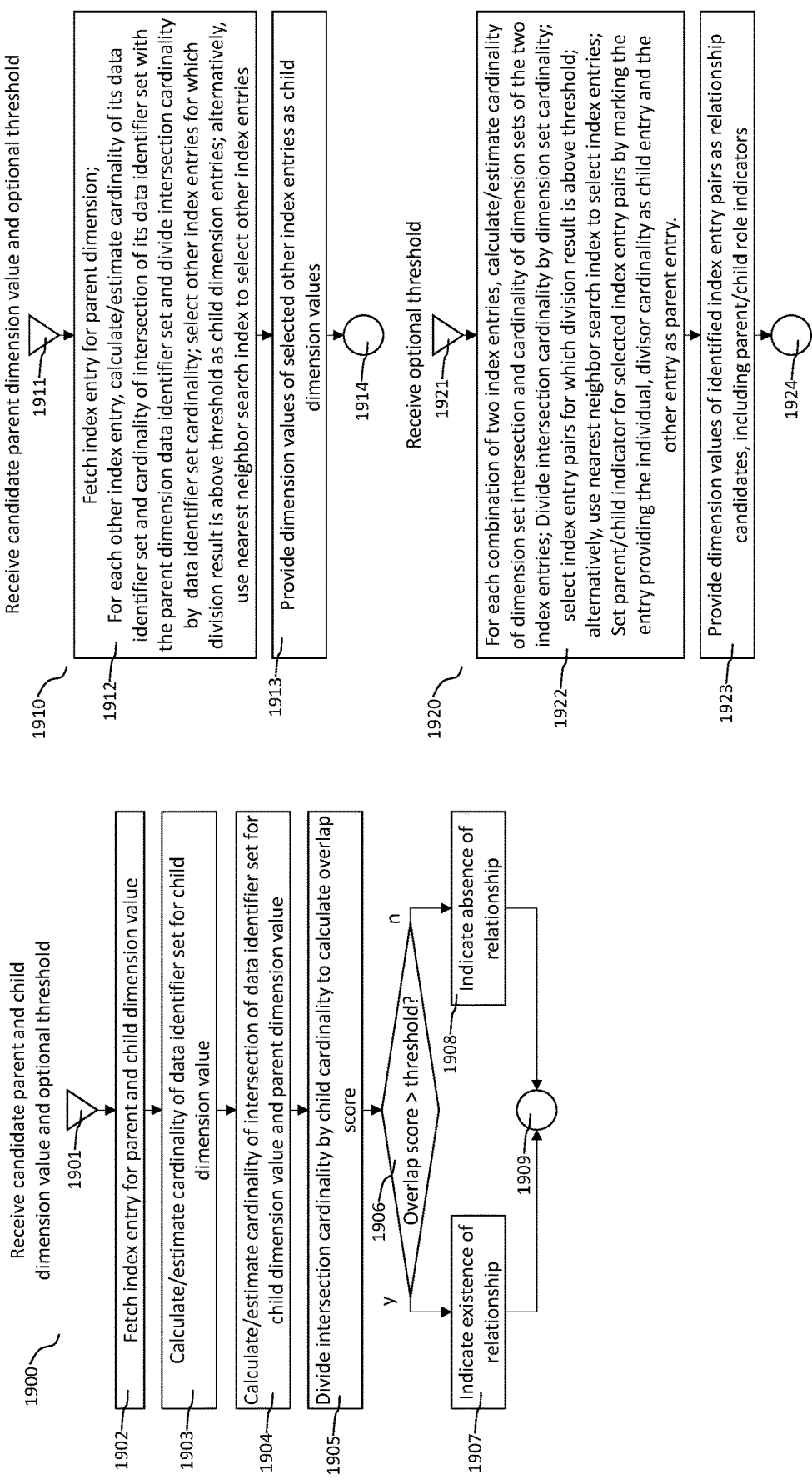

METHOD AND SYSTEM FOR THE ON-DEMAND GENERATION OF GRAPH-LIKE MODELS OUT OF MULTIDIMENSIONAL OBSERVATION DATA

CROSS-REFERENCE TO RELATED APPLICATIONS

This application claims the benefit of U.S. Provisional Application No. 63/185,703 filed on May 7, 2021. The entire disclosure of the above application is incorporated herein by reference.

FIELD

This invention generally relates to the integration of semi-structured monitoring data from different, potentially unrelated monitoring data sources, deployed to an observed environment, into one unified monitoring data space, and specifically to create unified, multidimensional observation timeseries data out of ingested monitoring data. The created multidimensional timeseries data may then be used for the on-demand generation of graph-like, time-dependent problem or domain specific models of the observed environment for the interpretation of monitoring artifacts, like unexpected monitoring data.

BACKGROUND

Service oriented system architecture paradigms, together with cloud-based execution environments are core enablers for new classes of software applications that are capable to provide almost any kind of user demanded service and that can also be rapidly adapted to changed user demands. In addition, supported by the elasticity provided by cloud-based environments, those applications can also be scaled in wide ranges to cope with various quantities of user interactions.

However, this leads to highly heterogeneous applications, which depend on the seamless interoperation of various communicating services. Those services may be implemented using different technologies and may also be operated in different cloud environments for technical or commercial reasons. In-depth, detailed, and most of all unified monitoring of such applications is often not possible due to deviating monitoring solution available for different service technologies of cloud vendors, which typically result in hard to maintain and understand monitoring data silos, which cover only portions or individual aspects of monitored applications or activities, without providing an integrated view on all the monitoring data. This raised the demands for accurate timely, and integrated monitoring data to gain observability to the internal states of an application and its components. Of same importance is a rapid analysis and interpretation of gained observability data to quickly identify undesired/erroneous operation conditions of a monitored application and to also identify appropriate countermeasures.

Examples for available, specialized but siloed monitoring data sources include current developments and initiatives, like the open-source monitoring and observability projects OpenTelemetry or OpenTracing, aim to increase the quantity and diversity of monitoring data to improve observability. Also, other monitoring data sources like JMX, to monitor Oracle Java® based environments and applications or the Windows Management Instrumentation (WMI) service by Microsoft to provide insight into Windows operating system and application data are in widespread usage to improve observability on application level.

In addition, cloud environment providers offer their cloud infrastructure specific monitoring infrastructure like e.g., CloudWatch for Amazon AWS cloud environments or the Azure Monitor interface for Microsoft Azure cloud environments. Those monitoring interfaces provide valuable insights into resource usage, performance related behavior and costs related to the underlying cloud infrastructure.

However, all those different types of monitoring data only represent specific isolated aspects of an application or its execution environment. They may be helpful to tackle isolated problems that do not spread into different areas of an application and cause other problems there, but it typically required laborious, tedious and error-prone manual work to integrate monitoring data from those different sources and to perform holistic analyses of overall monitoring data, like e.g., the identification of causal dependencies of observed anomalies, or the forensic analysis of monitoring data to e.g. determine the possibility of a data breach.

Consequently, there is demand in the field for a method and system that is capable to integrate monitoring data from different types of monitoring data sources, having different structures and semantics into a unified observation data space, which may be used as basis for various comprehensive analyses of various kinds.

This section provides background information related to the present disclosure which is not necessarily prior art.

SUMMARY

This section provides a general summary of the disclosure, and is not a comprehensive disclosure of its full scope or all of its features.

This section provides a general summary of the disclosure, and is not a comprehensive disclosure of its full scope or all of its features.

The present disclosure is directed to the ingestion of monitoring data from arbitrary, potentially disparate monitoring data sources deployed to a monitored environment, to integrate the monitoring data into a unified, universal monitoring data space. Various queries may be executed on the integrated and unified monitoring data at any time after data ingest for the ad-hoc creation of demand specific models of the monitored environment.

The created, demand specific models may be used for the analysis and visualization of monitoring artifacts. Monitoring data artifacts may include unexpected values of incoming monitoring data or unexpected high or low amounts of received monitoring data. Examples include missing heartbeat messaged from specific components indicating the unavailability of those components, or data indicating an unexpectedly high usage of resources by components or unexpectedly long response times of monitored services. In addition, those models may also be used for an automated, algorithmic analysis of those monitoring artifacts, including the identification of causal dependencies between different monitoring artifacts.

Embodiments of the disclosure may use sets of key-value pairs to specify locations in an unified monitoring data space, where the key element of such a key value pair specifies a specific dimension and the value of the pair specifies a distance in the specified dimension, e.g., from an origin. Together those key-value pairs define specific coordinates of a point or region in the unified monitoring data space.

Context data of received monitoring data may be analyzed to determine dimension key-value pairs for the monitoring data. Different instances of monitoring data having the same monitoring space dimension location are stored in a timeseries data structure that is assigned to the dimension location. The timeseries data structures store observed monitoring data points together with their observation time to describe the temporal development of the monitored parameter.

Variant embodiments may, on receipt of monitoring data from monitoring data sources, analyze and transform the received monitoring data to create the key-value format for the monitoring context data that is required for the storage in the unified monitoring data storage. As an example, those variants may split unformatted monitoring context data like a command line that was used to start a process, into different key-value pairs, where some key-value pairs may describe the name of a binary that is executed, and some may describe parts of the command line that were sent as parameters to the started process. Together, these key-value pair localize the monitored command line in the unified monitoring data space.

In addition, those embodiments may enrich context data of received monitoring data to localize the monitoring data more precisely in the unified monitoring data space. As an example, a monitoring data source may be placed on a host computing system and monitor and report data describing the host computing system and the processes running on the computing system. The monitoring data provided by the host-based monitoring data source may be used to localize the host computing system and the processes in the unified monitoring data space.

However, the reported host computing system may be deployed to an enclosing execution or resilience environment, like a Kubernetes cluster or the availability zone of cloud computing system. A second monitoring data source may be deployed to the enclosing environment and provide describing monitoring data. On receipt of monitoring data for the host computing system and for the enclosing execution environment, the monitoring system may create key-value pair data for both monitored components and store them in the monitoring data space. It may in addition detect that the reported host computing system is executed in the execution environment and, in response enrich the dimension coordinate data for the host computing system and the processes executed on the host computing system with additional dimension coordinate data are derived from the monitoring data received for the execution environment. This enrichment localizes the monitoring data for the host computing system and the processes running on the host computing system in the context of the execution environment.

Variant embodiments may apply rules on the dimensional key-value data that was extracted from the monitoring data to derive graph-like structures that describe specific aspects of the monitored environment from which the monitoring data was received. The extracted graph models may be directed to various perspectives of the monitored environment.

Some graph models may be created to support performance and functionality related analyses of the received monitoring data and may describe services, processes, and hosts existing in the monitored environment and their structural and communication related dependencies. Those graph models may be used to detect abnormal operating conditions, identify causal relationships between such abnormal operating conditions and to identify and optionally automatically apply appropriate counter measures to correct the abnormal operating conditions.

Other types of extracted models may be directed to support a cost-benefit analysis of cloud-based monitored environment, by creating graph models that connect applications and services generating revenue with cloud resources providing those services and applications and corresponding provisioning costs. Such models may contain entities describing those applications and services, where metric data describing generated revenue may be attached to those entities. In addition, these models may contain cloud resources, like virtual host computing systems, service entities, together with metric data describing their provisioning time and provisioning cost. These models may then be enriched with dependency data describing provision dependencies between services/application and the cloud resources providing those services/applications. Those dependencies may be derived from dimensional overlaps between monitoring data describing service and application entities and monitoring data describing cloud resources, like e.g., a matching network or cloud identifier.

Again, other types of extracted models may be directed to vulnerability analyses of a monitored environment. These models may contain entities representing processes providing application functionality, together with entities representing code libraries that are used by those processes to provide desired functionality. Library entities may also contain version information data, which may be used to determine whether those libraries are affected by vulnerabilities. In addition, those models may contain library usage and communication dependency data. Such models may be used to determine whether processes providing application functionality used vulnerable libraries, and whether those processes performed undesired activities, like communication with untrusted counterparts, which indicate a potential exploitation of a vulnerability.

Still other types of models may be directed to the efficiency analysis of marketing campaigns, where some entities of generated models may represent a marketing campaign, e.g., by its duration, targeted demography or geographic location, and where other entities represent changes, like additional registered users by their demography and geography, that as results of those marketing campaigns.

All those different types of models may be created at any time, after or during monitoring data is acquired, as long as all data that is required to generate those models is available in the dimension data format of the ingested monitoring data.

Requirements for additional types of models may only become apparent after monitoring data was ingested and stored in form of context-dimension aware timeseries. Therefore, the proposed system and method need to be adaptive and capable to generate types of models that where not known at the time when the monitoring data was recorded.

To achieve such flexibility, embodiments may follow a rule-based model generation approach, where users of the monitoring system may define sets of model-generating rules, which may be applied to monitoring data to generate desired models out of the monitoring data. Predefines rule sets may be provided by a monitoring system vendor for the most common model types and monitoring system users may change, augment, and improve those rule sets according to their needs. Monitoring system users may also develop new rule sets to generate types of models that were not anticipated by the monitoring system provider. Some variants of model generating rules may be dedicated to generating entities of a model and other variants may be used to generate dependencies between model entities.

Variant embodiments may in addition to dimensional key-value data extracted from monitoring data, also consider the time when corresponding monitoring data was observed. As mentioned above, unified monitoring data may be stored in form of timeseries, which describes the temporal development of an observed parameter, like the CPU usage of a specific host computing system, the response time of a specific service, or the availability of a specific process or host. Such a timeseries may contain a set of datapoints, where each datapoint contains an observation timestamp and an observation value. Each of those timeseries may be combined with a dimensional key-value set, which describes the context of those observations, like the name or network address of a host computing system on which an observation was performed, type, configuration, vendor name, of the host computing system, or data describing the hardware resources of the host computing system or, for the operating system running on the host computing system, its name, version and vendor.

This combination of multidimensional context data, with observation timing data for those contexts may be used to create models that also consider temporal changes of observation data. As an example, model generation rule sets may only be applied to monitoring data that falls into a specific time period, that are older than a specific timestamp or younger. Such snapshot models may be used to illustrate and analyze the temporal evolution of a monitored environment.

Variant embodiments may perform model creation and analysis of monitoring artifacts in view of the created model in an interleaved, iterative way. As an example, a performance anomaly detection and root cause identification system may continuously monitor the response time of some important services. On detection of an undesired behavior, like increased response time or increased error rate on one of those services, the system may apply entity creation rules on monitoring data for this service to create an initial model that only contains the affected service. Afterwards, it may apply dependency and entity creation rules on monitoring data that is related to the affected service, to enlarge the initial model by adding the direct neighbors of the affected service to the model. The system may then search monitoring data of the direct neighbors in the model to detect those neighbor entities that also show undesired behavior, enlarge the initial model by their direct neighbors and continue search there. This interleaved and iterative model enlargement and model guided monitoring data analysis may be continued until either no more data indicating undesired behavior is found, or no more new model neighbors can be identified. Afterwards, the identified abnormal operating conditions may be analyzed in view of the created model to identify causal relationships and to determine root-cause anomalies.

Yet other variant embodiments may analyze use set relationships to identify relationships between individual dimension key-value instances based on the dimension sets in which they occur. These variants may create relationship search index data structures which map individual dimension key-value instances to the dimension set in which they occur.

To determine if two individual dimension key-value instances have a relationship, the index may be used to fetch for each of the key-value instances data describing the sets of dimensions containing the key-value instance. An overlap score may be calculated for the two sets of dimensions which may be used as indicator for the probability that a structural relationship exists between the two dimension key-value instances. If the selected key-value instances are also identifiers for entities in a to be created model of an observed environment, so identified relationships may also be used to insert corresponding relationships into the to be created model.

Further areas of applicability will become apparent from the description provided herein. The description and specific examples in this summary are intended for purposes of illustration only and are not intended to limit the scope of the present disclosure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The drawings described herein are for illustrative purposes only of selected embodiments and not all possible implementations, and are not intended to limit the scope of the present disclosure.

FIG. 1 shows the data flow and the data transformations that are performed for the on-demand generation of domain-specific models out of gathered heterogeneous, semi-structured monitoring data.

FIG. 2 provides a block diagram of a monitoring system that is capable to ingest semi-structured monitoring data from different types of monitoring data sources, to integrate the monitoring data by generating corresponding multidimensional timeseries and to use the dimension data of generated timeseries for the on-demand generation graph-like models that describe various aspects of the monitored environment.

FIG. 3 conceptually describes the ingest process for some exemplary types of monitoring data and illustrates the transformation of semi-structured monitoring data into multidimensional timeseries data.

FIG. 4 shows data records that may be used to control the ingest and transfer of monitoring data and to store multidimensional observation and time series data.

FIG. 5 exemplary shows the creation of entities or nodes of a graph model of an observed environment using a set of dimension data mapping rules and some multidimensional observations on which the mapping rules are applied.

FIG. 6 shows the enrichment of a model consisting of entities/nodes with structural dependencies/edges that connect those entities/nodes. Mapping rules and multidimensional observations are used to generate those dependencies/nodes.

FIG. 7 describes records that may be used to store creation rules for entities/nodes and structural dependencies/edges.

FIG. 8 shows the enrichment of an exemplary graph-like model of a monitored environment with dependencies/edges that describe observed communication activities. Specific mapping rules are applied to communication monitoring data to identify communication types and entities/nodes involved in observed communication activities to generate corresponding dependencies/edges and to enrich the model of the monitored environment accordingly.

FIG. 9 provides an exemplary record to store a rule to identify communication related dependencies/edges.

FIG. 10 visually shows the mapping of multidimensional timeseries or observation data to create different, domain specific models of a monitored environment.

FIG. 11 illustrates the generation of different model versions based on observation data from different time intervals.

FIG. 12 depicts a flow chart of a process that processes multidimensional observation data using various mapping rules to create a demand specific model of a monitored environment.

FIG. 13 provides a flow chart of an exemplary process for an iterative and interleaved enhancement/expansion and interpretation/analysis of a model of an observed environment, which optimizes the enhancement/expansion of the model according to the requirements of the performed interpretation/analysis.

FIG. 14 shows an exemplary traversal query that is based on an on-demand generated, query optimized model of a monitored environment.

FIG. 15 shows another exemplary traversal query that in additional considers temporal changes of data contained in the generated model.

FIG. 16 provides a data record that may be used to store traversal data queries, and an exemplary traversal query.

FIG. 17 shows a flow chart of a process that executes a traversal query by iteratively and incrementally extending a model of an observed environment according to the requirements of the traversal query.

FIG. 18 proposes a search index for the automated detection of strong structural relationships between individual key-value instances. The relationship search index creates mappings from individual key-value instances or dimension values to the dimension sets containing those key-value instances.

FIG. 19 shows flow charts of processes that use the structural relationship search index to determine the existence of strong structural relationships between individual dimension values.

Corresponding reference numerals indicate corresponding parts throughout the several views of the drawings.

DETAILED DESCRIPTION

Example embodiments will now be described more fully with reference to the accompanying drawings.

Example embodiments will now be described more fully with reference to the accompanying drawings.

The described embodiments are directed to monitoring systems that are capable to ingest monitoring data of any type and format, which is received from any monitoring data source. Received monitoring data is first transformed into a unified, timeseries oriented format and then stored in a repository for later interpretation and analysis.

Received monitoring data records are analyzed to separate data describing a measurement and data describing the context of the measurement. Identified measurement context data is transformed into a set of key-value pairs, where each key defines a specific context dimension, and each value defines an extend or value in this dimension. As an example, context data may specific a specific process and a host on which this process is executed. Two exemplary keys, defining two context dimensions may be "host" and "process". The respective values may be the network address of the host for the "host" dimension, and data extracted from the process command line for the "process" dimension. The value of a specific process parameter, like CPU or memory usage, process uptime or process availability, may, together with the time when this value was observed, form the measurement data.

The extracted context dimension coordinates are used as identification data for timeseries data structures that store measurement data sequences that were observed for those context dimension coordinates.

Interpretation and analysis of the unified monitoring data, like creating models describing aspects of the monitored environment from which the monitoring data originated and interpretation of this monitoring data in view of this models, may be performed at any time during or after ingestion of the monitoring data.

Coming now to FIG. 1, which provides a conceptual overview of the flow of the monitoring data. Basically, the monitoring data exists in an observation space 100, which covers the ingestion, unification and the dimensional, timeseries oriented permanent storage of received monitoring data, and in a model space 120, which covers the domain and demand oriented interpretation of stored, high-dimensional observation data, to create adaptive, on-demand models from the observation data.

Unified monitoring data may be processed by domain-specific model generation processes 110 to create various types of domain specific models.

Monitoring data sources, like monitoring agents or other monitoring interfaces are placed in a monitored environment 101 and provide raw monitoring data. Raw monitoring data may be available in form of scalar measurements, log files, transaction trace data including user action data, process, application or operating system crash reports or data describing the usage of mobile applications or devices.

The raw monitoring data 102 is forwarded to a "Dimensionalization" stage 103, which unifies the received raw monitoring data by determining the context dimension coordinates of received raw monitoring data, extracting measurement datapoints in form of a value and a timestamp, identifying timeseries records that match identified context dimension coordinates in a high-dimensional observation storage 105 and storing the measurement datapoints in identified timeseries.

Various cyclically ongoing or on-demand interpretation and analysis tasks may trigger the creation of domain-specific on-demand models 121 from stored high-dimensional observation data 105. Those models 121 may be created for single usage, get persisted, or cyclically updated. They may be based on all or only a subset of the available observation data 105, where the selection of monitoring data that is used for model creation may include special and/or temporal restrictions. The created models 121 may be used for model-driven monitoring data artifact detection 122, like an unexpected increase of CPU usage by a specific process, or an increased response time of a specific service. Those models may also be used for model-driven monitoring data artifact interpretation 123, like the identification of causal dependencies between identified monitoring data artifacts. Further analyses 124 may be performed on identified and interpreted monitoring data artifacts, like the detection of causal chains of monitoring data artifacts and the identification of monitoring data artifacts that represent the root-cause of for other monitoring data artifacts.

An architectural overview of a monitoring system that is capable to ingest and unify various disparate types of monitoring data and to use this unified monitoring data for the creation and usage of arbitrary models of a monitored environment is shown in FIG. 2.

Various monitoring data sources, in form of agents 207, 208 or monitoring application programmable interfaces (APIs) 209, are located at components 201, 202 and 203 of a monitored environment 200. Various dependencies 204, 205 and 206 exist between those components. Some of those dependencies may be of structural nature, like the dependency of a process on the host computing system on which it is executed. Other dependencies may be of communication nature, like services that require communication with other services to fulfill their purpose. Dependencies of other types or natures may exist in monitored environments, like dependencies that are related to security, financial or organizational concerns. Monitoring data sources 207, 208 and 209 generate monitoring data 220 in at least semi-structured form. Exemplary monitoring data 220 includes but is not limited to individual measurement data points describing individual observations, measurement data point lists, transaction or application traces including user action data, log data from various types of components like operating systems, process or virtualization infrastructure or monitoring data indicating an availability or accessibility status of components of the monitored environment. The monitoring data 220 is received by a monitoring server 230, which forwards it to a data ingestion and normalization unit 231.

It should be noted that the monitoring server 230 may in some variant embodiments implemented as single node that receives and processes all monitoring data. In other embodiments the monitoring server 230 may be implemented as a cluster of interconnected processing nodes, where each processing node receives and processes a fraction of the monitoring data. The processing nodes may cooperate to in common create a logical monitoring service that is capable to receive and process all incoming monitoring data and that is also capable to accept and process various analysis requests using the ingested monitoring data.

On receipt of monitoring data 220, the data ingest and normalization module 231 may access ingest configuration 232 to translate the received monitoring data into one or more unified, dimensional data points 234. A dimensional data point 234 may contain observation meta data, describing type and context of an observation and observation measurement data describing a specific observation. The created dimensional data points are forwarded 233 to a timeseries storage 242, where the dimensional data points 234 are used for the creation or update of dimensional timeseries records 235.

Details about the data ingestion process, data structures to store dimensional data points and dimensional timeseries can be found in FIGS. 3 and 4.

Model generation or update requests 238 may be received by the monitoring server 230, either as directly initiated by user requests, or as subtasks of one-time or perpetual analysis tasks performed by an analysis model 250 of the monitoring server.

The analysis module 250 may receive analysis tasks 251, and access 252 dimension timeseries data directly, request 238 generation of new or update of existing models 241 from the model extraction module 237 and interpret and analyze those created or updated models to fulfill the received analysis tasks. The received analysis tasks may be ongoing, like the constant observation of specific timeseries records relating to core functionality of a monitored environment for changes indicating undesired operating conditions and, in case such undesired operating conditions were detected, to identify other abnormal/undesired operating conditions that may have caused the initially identified undesired operating condition, until eventually an abnormal operating condition is found that represents the root cause for all other identified, causally related abnormal operating conditions. Examples for undesired operating conditions include an increase of response times or error rates of service requests, or the unexpected shutdown or crash of components of a monitored environment, like processes or host computing systems. Undesired operating conditions like increased response times or error rates may be identified by analyzing time series data for corresponding response time or error rate measures and comparing them either to a fixed threshold, or to a base line value representing a normal range of those measures which may be gained by a long-term observation of those measures. An increase of current measure values that exceed those thresholds may be used as an indicator for an abnormal operating condition.

An absence of monitoring data related to components like processes or host computing systems that exceeds a certain duration may be used as an indicator that those components are no longer active in the monitored environment, due to a crash or other type of outage, which may also be considered as undesired/unexpected operating condition.

FIG. 13 describes the processing of such an analysis task, including the on-demand creation and update of a topological model according to the requirements of the causality analysis task. Next to such ongoing analysis tasks, which continuously analyze monitoring data to identify anomalies and to detect potential causes for those anomalies, also on-demand analysis tasks, like traversal query requests may be received and processed. Examples for such traversal queries can be found in FIGS. 14 and 15.

The model generation requests 238 may be received by a model extraction module 237, which may on receipt of a model generation request select 239 a model extraction rule set 243 according to the received model generation request. The model generation or update request may specify the type of the desired model and the model extraction module may use this type information to select an appropriate model extraction rule set 243.

A model extraction rule set 243 may contain multiple extraction rules that are directed to extract entities and dependencies between those entities out of dimensional monitoring data. A detailed description of those creation rules can be found in FIGS. 7 and 9, and exemplary applications of such creation rules on dimensional observation data are shown in FIGS. 5, 6 and 8.

After an appropriate model extraction rule set was selected, the model extraction module may access the timeseries storage 242 to query 236 dimensional monitoring data from the timeseries storage 242 which is required for the desired model generation. Model generation or update requests 238 may contain filter expressions that define the monitoring data that should be used as input for the model generation. Those filter expressions may be used by the model extractor to select the appropriate monitoring data. Such expressions may specify a time range for which monitoring data should be considered, they may specify dimensions or dimension values that should be present on selected monitoring data, or they may be based on monitoring data ownership, or the monitoring data sources that provided monitoring data.

After the appropriate dimensional monitoring data is fetched, the model extraction module 237 applies the selected model extraction rule set on the fetched data to generate the requested model 241 and provide it 240 for further visualization, storage, or analysis.

Coming now to FIG. 3, which provides a conceptual overview of the processing steps that are performed during the ingest of received monitoring data to transform it into dimensional timeseries data.

In a first step 300, raw monitoring data is received by the ingest module 231, which is forwarded to a second ingest step 310, which performs monitoring data type or vendor specific processing of the received raw monitoring data. Types of ingested raw monitoring data may contain but are not limited to log data 301 in form of log files 302, transaction trace data 303 in form of trace data fragments 304 describing portions of transaction executions and scalar metric data 305 in form of individual or grouped observations 306.

Log files 302 may include operating system and process level log files. Those log files may contain multiple log lines, where each log line contains, but is not limited to of a timestamp, a severity indicator, and a textual description of an observation.

Trace data fragments 304 describe monitored code executions e.g., in form of data identifying executed code, duration of code execution and execution context data, like data identifying a parent code execution. Combined, trace data fragments may be used to describe end-to-end transaction executions. As an example, the open-source tracing framework "OpenTelemetry" defines a "span" data structure to describe such execution segments.

Observation 306 represents individual monitoring data units, like the measurement of the CPU usage of a specific process at a specific point in time, a specific observed communication activity of a specific process, start or shutdown of a host computing system, container, or process, etc. Diverse types of monitoring data sources are available that are capable to provide such monitoring data, like Microsoft's Windows Management Instrumentation® WMI, Oracle Java® JMX, SNMP. Those types of monitoring data source types provide monitoring data various diverging structured in semi-structured formats. Those formats may either be standardized or proprietary and specific to a single vendor. Most of those monitoring data formats are highly adaptability and flexible to cover most user and application requirements. However, this flexibility represents a considerable obstacle for the generic, automated processing and analysis and interpretation of this monitoring data.

Examples of type and vendor specific processing tasks include log data analysis tasks 311 or trace data analysis 312. Log data analysis 311 may identify and group similar log lines and e.g., create statistical metric data based on the frequency of log lines that fall into similarity groups. Trace data analysis 312 may identify and combine trace data fragments that are in a caller/callee relation, where an execution described by a specific trace data fragment (the callee) was caused by a call described in another trace data fragment (the caller).

The next step in the monitoring data ingest process is the type and vendor specific dimension and metric data extraction 320 step. In this step, the raw monitoring data is segmented to identify and isolate measurement value, measurement type, measurement timestamp and the dimensional context data.

As an example, raw measurement value in form of a process command line and a corresponding process start timestamp may be received. In this case, the measurement value may be a status indicator that a process with this command line was started and the process start timestamp may be used measurement timestamp. The executable name of the command line and the command line parameters may be used as dimensional context data. Additional data, like identification data for the host computing system on which the process was started, may also be used to generate dimensional context data if they are available with the received monitoring data.

For log data, the type and vendor specific dimension and metric data extraction may also contain 321 usage of the log data origin, like the name of the log file and its folder as dimensional context data and frequency data for identified log line groups as measurement value.

For trace data, communication endpoint data, like network address and port for identified communication parties, type of observed communication and identification data for communicating services 322 may in addition be used as dimensional context data. As an example, trace data may specify an outgoing database query request that addresses a database service using a specific URL. This URL or parts of it may be used as service identifying dimensional context data.

For observations 306 of scalar metric data 305, the type of the received observation data typically defines the part of the observation data that represents measurement value and timestamp and the additional context data that reveals origin and other data describing the conditions of the measurement, and observation type specific extraction processes may be used to extract those measurement data portions.

Extracted type and vendor specific dimensional monitoring data is forwarded 331 to the dimension normalization step 330. Aim of this step is to identify dimension keys that have the same semantics but different names and to unify those. As an example, one type or vendor of monitoring data may use the term "host name" as key for identification data of a host computing system and another vendor may use the term "computer name" instead. The dimension normalization step maps 332 external monitoring data type or vendor specific dimension data to an internal representation. A mapping configuration 334 may be used 333 for this mapping step. Parts of the mapping configuration may be predefined and shipped with the monitoring system. the predefined mapping configuration may be extended/adapted in the field by a user of the monitoring system according to type and vendors of the monitoring data sources deployed to a monitored environment and to the format of monitoring data generated by those monitoring data sources.

The goal of the following dimension enrichment step 340 is to create complete, "absolute" dimensional context data as far as possible. As an example, observation data describing the start of a process in form of a command line may contain data that may be used to create dimensional context data describing the process e.g., in form of executable name and command line parameter. However, it contains no data describing the execution location of this process, like identification data for the host computing system or container executing the process. In step 340, monitoring data describing the host computing system or container execution this process may be identified, and the dimensional context data for the process may be enriched with dimensional context data for the host computing system executing the process.

Dimension enrichment may use 342 enrichment configuration data 343 to identify 342 observations that cover different aspects of the same entity, like for container related observation data, data describing container internal aspects, like processes executed in the container and external aspects of the container, like the host computing system on which the container is executed. Overlapping dimensional context data, like in the case of a container, a container identifier which is both available for container internal and container external observation data may be used for this merge. If no overlapping dimensional data is available, data describing the location of monitoring data source may be used for the merge to e.g., merge process observation data from a monitoring data source that is located on a specific host computing system with monitoring data describing this host computing system, as the monitoring data source providing process observation data typically only provided process monitoring data for the processes of the host computing system on which the monitoring data source is located.

After the dimension enrichment step 340 is completed, the created dimensional observation data is stored in form of dimensional timeseries in concluding step 350. Conceptually step 350 groups 351 measurement values by their measurement type and dimensional context data to form groups of measurement values having the same measurement type and the same dimensional context data and then sorts the grouped measurement values by their measurement timestamps to create dimensional timeseries records.

Coming now to FIG. 4, which shows data records to store dimensional monitoring data and data records to store configuration parameters that define the monitoring data ingest process.

A dimensional data point record 234, which may be used to temporarily store ingested unified and structured monitoring data as e.g., produced by the type and vendor specific dimension and metric data extraction step 320 of the ingest process, may contain but is not limited to a observation meta data section 410 containing context and type related metadata describing the monitoring data and a data point observation section 420, describing the concrete measurement data e.g., in form of an acquisition time stamp 421 and observation payload data 422 e.g., in form of an observed value for a measured parameter like CPU/memory usage or service response time.

Observation meta data record 410 may contain but is not limited to a dimension set 411 to store context dimension coordinates of an ingested monitoring data point, a metric type 415 specifying the type of the ingested monitoring data, and an environment or owner field 416 identifying the monitored environment 200 from which the data point was received, or the owner/vendor/operator of this environment. A dimension set 411 may contain one or more dimension records 412, where each dimension record may contain a key field 413 which specifies a certain dimension and a value field 414 defining a certain extent of the dimension specified by the key field.

A dimensional timeseries record 235 may be used for the permanent storage of ingested monitoring data as described in the monitoring artifact storage step 350 of the monitoring data ingest pipeline.

A dimensional timeseries record 235 may contain but is not limited to an observation meta data section 410 and an observation list section 431. The observation list section 432 may contain one or more data point observations 420. The observation list 431 of a dimensional timeseries record 235 may contain data point observation records 420 form dimensional data points 234 having equal observation meta data. Therefore, the single observation meta data record 410 of a dimensional timeseries record 235 represents the observation meta data of all data point observations in its observation list 431.

An observation data mapping rule 440 may be used by the dimension normalization step 330 of the ingest pipeline to transfer type and vendor specific dimension sets into corresponding unified, internal representations.

An observation data mapping rule 440 may contain but is not limited to an input dimension set identifier 441 that may be used to select dimension sets 411 of received dimensional data points by their key names, a dimension mapping rule set 442, which defines the translation of dimension key-value pairs of received data points into internal representations, an environment/owner determination instruction 444, which may be used to determine the monitored environment from ingested monitoring data originated, or the monitoring system owner that controls or owns the monitored environment, a timestamp determination instruction 445, which may be used to determine a timestamp for the processed observation data record and a set 446 of observation data instructions which may be used to extract one or more metrics from the processed observation data record.

The input dimension set identifier 441 may represented as a hash value that may have been calculated from a set of dimension keys for which the dimension set mapping rule should be applied. On receipt of a new dimension set for conversion, a hash value may be calculated for the keys of the dimension set and compared with the input dimension set identifiers 441 of known observation data mapping rules 440, and an observation mapping rule 440 with an input dimension set identifier 441 matching the calculated hash value may be selected to process the received dimension data.

A dimension mapping rule set 442 may contain one or more dimension mapping rules 443. Each dimension mapping rule 444 defines a step to convert one or more input dimensions in form of a key-value pair into one or more result dimension also in form of a key-value pair. An input key identifier 444 may selects at least one key of the input key-value dimension set and a dimension mapping instruction 445 defines processing steps on the input dimension identified by the input key identifier that transfers the input key-value pair into one or more output key-value pairs. A dimension mapping rule may select one or more input dimensions and create one or more output dimensions. An example for a dimension mapping rule creating multiple output dimensions would be a dimension mapping rule directed to the processing of received command lines, which may create one output dimension for an executable specified by the command line and additional output dimensions for each command line parameter of the received command line.

Environment/owner determination instructions 444 may either be based on the processed observation data record and extract an identifier for environment or owner by parsing this data record according to specific parsing instructions. Alternatively, the environment/owner determination instruction can be based on the origin of the processed observation data record, like a specific agent or other monitoring data source to determine environment/owner. Communication activity between monitoring data sources and the monitoring server 230 typically allow the monitoring server to determine the network address of the monitoring data source. This network address may then be used to determine the monitoring environment that is monitored by the monitoring data source, and also to determine the owner of the monitored environment. Environment/owner determined for the monitoring data source may then be used as environment/owner data 416 for a created dimensional data point 234. Environment/owner data 416 may, in monitoring setups where multiple users share one monitoring server installation, be used to separate monitoring data from different monitored environments/monitoring system users.

Timestamp determination instructions 445 may be used to determine the timestamp 421 of a created dimensional data point 234. Timestamp determination instructions 445 may be based on the currently processed observation data record and contain parsing instructions to extract data for the time when the observation described by the currently processed data record was made. Alternatively, timestamp determination instructions 445 may be based on the time when the processed observation data record was received by the monitoring server.

An observation data instruction set 446 may contain at least one metric type and observation payload extraction instruction 447, which may be used to extract metric type 415 and corresponding observation payload data 422 from a processed observation data record. Metric type and observation payload extraction instructions typically contain instructions to parse an observation data record to first find an indicator for a specific type of metric, like CPU or memory usage or service response time, and after such an indicator was found, to continue parsing the observation data record to find a corresponding metric value or observation payload 422, in form of the amount of used CPU or memory or the duration of a service call.

Observation data records may contain multiple types of metrics, as an example, an observation data record for a process executing in an observed environment may contain monitoring data for CPU usage and memory usage of the process. Therefore, multiple metric type observation extraction instructions 447 may be applied to an observation data record. This may create multiple dimensional data points, each of the created dimensional data points having identical dimension data sets 411, environment/owner and timestamp 421 data, but different metric types 414 and observation payload data 422, describing the different metrics contained in the observation data record.

A dimension enrichment rule 450 may be used by the dimension enrichment step 340 of the data ingestion pipeline to identify observations of different type that describe different aspects of the same observed component and to enrich the dimensional context data for those observations.

A dimension enrichment rule 450 may contain but is not limited to a dimension provider type identifier 451, which identifies the keys of a dimension set of an observation that may provide dimension data that may be used to enrich the dimension data of another observation, a dimension receiver type identifier which identifies the keys of a dimension set of an observation that may be enriched by dimension data from a dimension provider type, a match dimension set 453, which may be used to determine whether two observations of type dimension provider and dimension receiver describe the same observed component, and a dimension mapping rule set 454, which specifies how dimension data of a dimension provider observation is transferred to dimension data of a dimension receiver observation.

As an example, a first observation describing a deployment/availability zone of a cloud computing environment, containing dimension data for a deployment zone name, a deployment zone identifier and a cloud type and vendor name and a second observation describing a virtual host computing system residing in the deployment zone containing dimension data for name and network address of the host computing system and the deployment zone identifier. It is desired to enrich the dimension data for the virtual host computing system with dimension data for the deployment zone in which it is residing.

A corresponding dimension enrichment rule 450 may specify the dimension keys of the deployment zone (i.e., deployment zone name and identifier, cloud type and vendor name) as dimension provider type and dimension keys of the host computing system (i.e., host name and network address and deployment zone identifier) as dimension receiver type identifier. The match dimension set 453 may specify that deployment zone identifier of deployment zone observation and host observation must match for a dimension enrichment.

The dimension mapping rule set 454 may specify the dimension data from the deployment zone observation (i.e., deployment zone name, cloud type and vendor name) that should be transferred to the host observation.

Coming now to FIG. 5, which shows the exemplary evaluation of model creation rules on context dimension data e.g., in form of dimension sets 411 as created by the monitoring data ingestion process described in FIG. 3 to create entities of a model describing an aspect of a monitored environment.

Dimension data 500, 503, 508 and 512 from observations received from a monitored environment 200 is analyzed using different entity creation rules (for details see entity creation rule in FIG. 7) to create entities describing specific aspects of the monitored environment in a model space 530.

The chosen example model describes a structural, deployment specific aspect of the monitored environment in which desired entities are deployment zones, hosts, processes, or services provided by hosts.

Observation 1 500 contains a first dimension 501 specifying a deployment zone with name "z1" and a second dimension 502 specifying a host computing system with name "h1". A first entity creation rule 700 directed to the identification of deployment zones is applied 520 to dimension 501 and creates entity 531 of type "dz" 532 (for deployment zone) and identifier "z1" 533. A second entity creation rule 700 directed to the identification of host entities is applied 521 to dimension 502 and creates entity 534 of type "host" 535 and with identifier "h1" 536.

Observation 2 503 contains a deployment zone 504, a host 505, a process type 506 and a process 507 dimension. Entity creation rules 700 are applied to the host dimension 521 and the process dimension 523 to create an entity 543 of type host 544 with identifier "h2" 545 and entity 549 of type process 550 and identifier "p2" 531.

Observation 3 508 contains a dimension for a deployment zone 508, a host 510 and a disk 511 on which entity creation rules 700 are applied 520, 521 and 524. An entity creation rule directed to the creation of deployment zones is applied 520 to dimension 509, which would create an entity of type deployment zone with identifier "z1". As corresponding entity 531 was already created by the evaluation of dimension 501 of observation 1, this does not create a new entity in the model space. Entity creation rules directed to the creation of host and disk entities are applied 521 and 524 to dimensions 510 and 511 of observation 508 and create corresponding entities 537 of type host 538 and with identifier "h3" 539 and 540 of type disk 541 with identifier "d3" 542.

Observation 4 512 contains dimensions for deployment zone 513, host 514, process type 515, process 516 and service 517. An entity creation rule 700 directed to the creation of deployment zone entities may be applied to dimension 513 and may reveal that corresponding entity 531 is already available in the model space and no additional entity needs to be created. However, dimension observations 501, 504, 509 and 513 may be used for the analysis of the temporal changes of the model, as those four dimension observations indicate the existence of entity 531 at four different timestamps.

Entity creation rules 700 directed to the creation of hosts, processes and services may be applied 521, 523 and 525 on dimension observations 514, 516 and 517 and create corresponding entity 546 of type host 547 and with identifier "h1" 548, entity 552 of type process 553 and with identifier "p3" 554 and entity 555 of type service 556 with identifier "s1" 557.

Coming now to FIG. 6, which describes further evaluations of observations 1 to 4 to detect structural dependencies between identified entities and to update the model 530 accordingly. Structural dependency creation rules 710, which are described in more detail if FIG. 7, may be applied on the observations to identify structural dependencies.

Observation 1 500 contains dimension 501 indicating deployment zone "z1" and dimension 502 indicating host "h1". This dimension data may be used as input 600, 601 for the evaluation 602 of a structural dependency creation rule directed to identify "deployed to" dependencies between deployment zones and their deployed hosts. Result 603 of the rule evaluation would be the creation of a "deployed to" dependency 630 which indicates that host "h1" modelled by entity 534 is deployed to deployment zone "z1" modelled by entity 531.

Observation 2 contains dimensions 504 and 505 indicating deployment zone "z1" and host "h2", which may be used to create "deployed to" dependency 631 between the entities representing "z1" (531) and "h2" (543). Further, observation 2 contains dimension 507 indicating process "p2". Dimension 507 and dimension 505 may be used by a structural dependency creation rule directed to the detection of "runs on" dependencies between hosts and processes to create "runs on" dependency 636 between entity 543 representing host "h2" and entity 549 representing process "p2". Further, observation 2 contains dimension 506 indicating a process type "t1", which may be used, together with dimension 507 indicating a process instance, by a structural dependency creation rule that is dedicated to the identification of process type groups and the assignment of process instances to process type entities. The evaluation 626 of rule "process belongs to process type group" may use dimension 506 as input 625 for the creation of entity process type group 638, with type "process group" 639 and identifier "t1" 640, and "dimension 507 to determine that process "p2" represented by entity 549 belongs to the created process type group "t1" 638. The visualization of process type group "t1" 638 as component that encloses the processes ("p2" and "p3") belonging to this group was intentionally chosen to distinguish grouping dependencies from other structural dependencies. An equivalent visualization could represent process type group "t1" as individual entity and define group membership by "member of" dependency edges connecting entities representing processes belonging to the group with the entity representing the process group.

Structural dependency creation rules directed to identify dependencies between deployment zones and hosts and between hosts and disks may be applied on observation 3 508. Evaluation 602 of rule "host deployed to zone" may use 604 dimension 509 to identify entity 532 representing deployment zone "z1" and use 605 dimension 510 to identify entity 537 representing host "h3" and to further create the "deployed to" dependency 633 between both entities.

The evaluation of rule "host deployed to zone" 602 also illustrates the optional creation of entities that participate in an identified structural dependency if they are not already available in the currently created model 530. In case deployment zone entity 531 or host entity 547 had not existed in the model during the evaluation 602 of rule "host deployed to zone", this evaluation would have created 607 or 608 the missing deployment zone or host entity. In case those entities already existed at evaluation time, the evaluation of the structural dependency rule may have updated those entities with new, additional data describing those entities.

Further, a rule "disk attached to host" may be evaluated on dimensions 609 and 610 of observation 508 to create "attached to" dependency 634 between entities 537 and 540 representing host "h3" and disk "d3".

The dimensions of observation 4 512 indicate deployment zone "z1" (dimension 513), host "h4" (dimension 514), process type "t1" (dimension 515), process "p3" (dimension 516) and service "s1" (dimension 517).

A "host deployed to zone" rule may be applied to deployment zone and host dimension of observation 4 to create "deployed to" dependency 632 between entity 531 representing deployment zone "z1" and entity 546 representing host 4 (evaluation of this rule is not shown in FIG. 6).

The evaluation 615 of rule "process runs on host" may fetch 613 and 614 host and process dimension data from observation 4 and create 616 a "runs on" dependency 635 between entity 546 for host "h4" and entity 552 for process "p3. The rule "process belongs to process type group" is evaluated 618 on process type and process dimension data 515 and 516 to assign process "p3" to process type group "t1", and rule "provided by" is evaluated 622 on process and service dimension data 516 and 517 of observation 4 to create "provided by" dependency 637 between entity 553 for process "p3" and entity 555 for service "s1.

A key feature of the proposed, rule-based model generation system is that every rule evaluation only requires the analysis of one single observation and that the evaluation of each rule does not require establishment or maintenance of any external state, except the state of the model that is created. This is the basis for a fast, highly parallelizable, and distributable rule evaluation which is required for an on-demand generation of models of a monitored environment out of dimensional observation data.

Coming now to FIG. 7, which conceptually describes the structure of data records for model creation rules directed to the creation of entities of a model and of structural dependencies between those entities.

An entity creation rule record 700 may be used to represent rules to create entities of a graph-oriented model. Such an entity creation rule record 700 may contain but is not limited to a target entity type 701, which specifies the type of entities that such a rule may create, applicability criteria 702, which may be used to identify observation records on which the rule can be applied, instance identification determination instructions 703, which define the portion of observation dimension data that is used as input to calculate an identifier for a created entity and also processing instructions to calculate such an identifier and entity descriptive data extraction instructions 704 to extract other, descriptive data for the created entity out of observation data.

Structural dependency creation rule records 710 may be used to extract structural dependencies out of dimension data of observation records which may be represented as edges in a created graph-oriented model.

A structural dependency creation rule record 710 may contain but is not limited to a structural dependency target type 711, which specifies the type of structural dependency that is created by the rule, applicability criteria 712 defining type and structure of observation data on which the rule can be applied, like a set of required dimension keys, configuration data 713 to identify the entities that participate in a created structural dependency and dependency description data extraction instructions 714 which may be used to extract additional data describing an identified structural dependency.

An involved entity identification instruction list 713 may contain two or more involved entity identification instruction sets 720. Involved entity identification instructions may be used to identify the entities that are connected by an identified structural dependency. Typically, structural dependencies are binary and connect two entities like a host entity and a process entity with a dependency edge describing this dependency, like in the case of a host and a process, a dependency of type "runs on". As those binary dependencies connect two entities, also two involved entity instructions are required. However, also dependencies are thinkable that connect more than two entities. Rules that specify such types of dependencies would need more than two involved entity identification instructions 720, one for each connected entity.

Involved entity identification instructions 720 may contain but are not limited to entity type and instance determination instructions 721 which may specify the dimension data of an observation that should be used to determine type and identity of an involved entity, and optional entity role determination instructions 722. Entity type and instance determination instructions may specify a subset of dimension data, like the names of specific dimension keys, or specific dimension values to determine the type of an entity involved in a structural dependency. As an example, the existence of a dimension key "command line" or "executable" may be used to determine that the type of a connected entity is "process". Dimension values may be used for a more fine-grained entity type determination, as an example, a dimension with key "process type" may have potential values "Java", ".NET", or "native", which may be used to determine entities on process type level.

Entity role determination instructions 722 may be used on the creation of structural dependencies when the direction of a dependency is not implicitly given by the types of connected entities. As an example, for a "runs on" dependency connecting a host and a process it is obvious and can be derived from the types of the involved entities that the process runs on the host and that the direction of the dependency is from the host to the process. For structural dependencies that connect entities of the same type, or where the direction of the dependency cannot be derived from the entity types, additional configuration data in form of entity role determination instructions 722 is required to define the structural dependency. One potential example where dependency direction cannot be derived from entity types would be a container which runs inside another container. Both contains would be connected by a "runs in" dependency, but it is not possible to derive the direction of this dependency form the types of the connected entities. In this case additional entity role determination instructs 722 are required which may specify additional dimension data of the processed observation record that specifies the parent container instance and/or the child container instance.

The enrichment of a model with communication dependencies that are derived from observation data is shown in FIG. 8.

A model containing entity 555 of type 556 service and identifier "s1", entity 850 of type 851 service and identifier "s2" 852, entity 552 of type process 553 and identifier "p3" 554, entity 854 of type process 855 and identifier "p4" 856 and "provided by" dependencies 637 and 853 between process "p3" and service "s1" and between process "p4" and service "s2" may have been created by the evaluation of entity creation rules 700 and structural dependency creation rules 710 on context dimension data of received observations.

Context dimension data of observations describing communication on a service/transaction related level 800 and on process-to-process level 820 is used to enrich this model with communication related dependencies 861 and 860.

Context dimension data 800 extracted from transaction trace data describing the communication between two services as part of the execution of a monitored transaction may contain context dimension data identifying a depending service "s1", a providing service "s2, and protocol "HTTP" which was used for the observed communication between services "s1" and "s2".

A communication dependency creation rule 900 may be applied 813 to context dimension data 800 and use 810 the dependent service 801 dimension to identify entity 555 representing service "s 1" as the depending, or client side service of the observed communication. The providing service dimension 802 may be used to identify entity 830 representing service "s2" as providing or server-side service of the observed communication and the protocol dimension 803 may be used to determine the protocol that was used for this communication. The result 814 of the rule evaluation is communication dependency 861, which represents a call dependency from service "s1" to service "s2" using HTTP as communication protocol. In detail, the rule evaluation may use the "service" portion of the dimension keys "depending service" and "providing service" to determine that two entities of the type service are communicating, the values of those dimensions to determine the two communicating service instances (service "s1" and "s2"), and the "providing" and "depending" portions of the dimension names to identify service "s1" as client/depending service and "s2" as server/providing service.

A rule to identify generic, process-to-process communication dependencies is evaluated 840 on dimension data 820, from an observation that describes TCP/IP based process-to-process communication.

In this case, the dimension pairs "sender address" 821 and "sender port" 822 and "sender process" 823 may be used to identify entity 552 as the entity representing the sending process of the observed process-to-process communication activity. In detail, the "sender address" dimension data 821 may be used 828 to determine "host 1" as the host computing system on which the sending process is running via its network address, and the "sender process" dimension data 823 may be used 830 to identify entity 552, representing process "p3" on host "host 1" as sending process for the observed communication activity.

It is noteworthy, that multiple processes with an identifier "p3" may exist in a model. Only the combination with the host address/identification dimension data identifying the host computing system that executes the process with identification data for the process uniquely identifies the "p3" process instance that is involved in the observed communication activity. Typically, process-to-process communication monitoring data only contains network endpoint data in form of network addresses and ports. This network endpoint data may be used in combination with operating system management data that assigns running processes with network port usage data to determine the processes involved in observed communication activities. This combination is required to create communication observation data that also describes the processes that are involved in the communication. Monitoring data sources like agents 207 or 208 or monitoring data APIs 209 may perform this combination on the monitoring data source and already provide communication monitoring data that already contains process identification data. Alternatively, dimension enrichment 340 may, for monitoring data describing process-to-process communication activities, identify monitoring data describing corresponding port-to-process mappings and create combined monitoring data records that describe communication activities and involved processes.

Similarly, receiver address 824, port 825 and process 826 dimension data may be used during the rule evaluation to identify entity 854 representing process "p4" as receiver of the communication activity.

Analysis of the dimension key names of dimension "sender address" 821, "sender port" 822 and "sender process" 823 may reveal the result that process entity "p3" is the sending part of the observed communication and analysis of dimension key names "receiver address", "receiver port" and "receiver process" may yield the finding that process "p4" is the receiver of the communication.

Further, the "type" dimension 827 may reveal that the monitored communication activity is based on TCP/IP.

The result 843 of the rule evaluation on observation 820 is the communication dependency 860 of type TCP/IP, which is added to the model. In addition, the rule evaluation may create 841 842 entities that are involved in the monitored communication if they are not contained in the model, or it may update them if the communication monitoring data contains corresponding additional descriptive data for those entities.

Coming now to FIG. 9, which describes a communication dependency creation rule record 900 that may be used to derive communication dependencies from context dimension data of observation records.

A communication dependency creation rule record 900 may contain but is not limited to a communication dependency target type 901 which specifies the type of communication dependency that is created by the rule, applicability criteria 902, which may specify the dimension keys that are required for the successful evaluation of the rule and a set of involved entity identification instructions 903, which contain dimension evaluation instructions 910 to identify entities that are involved in a communication dependency, together with the roles that those entities have in the communication dependency and additional evaluation instructions 904 to extract descriptive data for a communication dependency out of dimensional context data of an observation record.

Similar to involved entity identification instructions 720 of structural dependency rules 710, also involved entity identification instructions 910 contain entity type and instance determination instructions 911 that are used to identify an entity that is involved in a communication dependency and entity role determination instructions 912, which may be used to determine the role (i.e., sender or receiver process, depending or providing service) that the identified entity has in the communication dependency. In contrast to involved entity identification instructions 720 for structural dependencies, role determination instructions 910 are not optional in the communication dependency case, as communication activity typically occurs between entities of the same type. Therefore, additional evaluation instructions to determine the role of an entity in a communication dependency are always required.

Exemplary mappings of dimensional context observation data to create different types of models according to different analysis requirements are shown in FIG. 10.

A simplified, exemplary three-dimensional observation data space is depicted in FIG. 10, which features a command line dimension 1000, a deployment zone dimension 1001 and a host computing system network address dimension 1002. Dimensional observation data records (not shown), containing concrete process command line/deployment zone/host computing system coordinates are located in this dimension space, and each dimensional observation data indicates the existence of a process started with a specific command line, running on a specific host computing system that is deployed to a specific deployment zone.

Three exemplary model mappings of this dimensional monitoring data are shown, that provide different, analysis task specific views on the data.

A "process on hosts" view 1010 shows hosts and processes running on them, while neglecting deployment zone data to create a model that focuses on the relationships between hosts and processes running on them. The model shows entities for host A 1011 and host B 1018 and entities 1013 to 1018 for processes 1 to 6 and structural dependencies 1019 to 1021 indicating that processes 1 to 3 run in host A and structural dependencies 1022 to 1024 indicating that processes 4 to 6 run on host B.

A "hosts in deployment zones" view 1030 provides a model that is restricted to deployment zones and the hosts deployed to them. Such a view may be used for a usage and cost analysis as it shows quantities of used deployment zones and hosts deployed to those zones. The created view shows entities 1032 to 1038 for hosts A to F, which are grouped by the deployment zones to which they are deployed, which indicates that hosts A to D are deployed to deployment zone 1 represented by entity 1031 and hosts 1036 to 1038 are deployed to deployment zone 2 represented by entity 1038.

A "processes in deployment zones" view 1040 only used process type and deployment zone data to create a model illustrating the distribution of process types amongst deployment zones. This view may be used to analyze the resilience of a monitored system against the outage of a deployment zone, as it helps to identify those process types for which processes only run on only one or a limited number of deployment zones, which are therefore more vulnerable to an outage of a deployment zone.

The exemplary "processes in deployment zones" view 1040 shows entities 1041 and 1042 for deployment zone 2 and deployment zone 1, and entities 1049, 1050 and 1051 representing process types C, B and A, and structural dependencies 1043 to 1048 which indicate that processes of type A are only executed in deployment zone 1, while processes pf type B and C run in both deployment zones.

Referring now to FIG. 11, which conceptually visualizes how observation timing data may be used to reconstruct models of a monitored environment that represent the state of the monitored environment as it was during past time periods.

As described in FIGS. 2 and 4, received observation data contains both multidimensional context data and observation timestamp data, and that this observation data may be stored in form of dimensional timeseries records, where a dimensional timeseries record contains observation meta data containing the dimensional context data and observation sequence data which describe for a given dimension context, when observations that document the existence of the observation context were made.

Therefore, those dimensional timeseries records 235 may also be considered as data describing the existence of dimensional contexts over time.

FIG. 11 shows charts 1100, 1101 and 1102 that represent dimensional timeseries records with context data that indicate the existence of entities A and B (charts 1100 and 1101), and a communication dependency between A and B (chart 1102). The data points 1103, 1104a, 1104b, 1104c, 1106, 1105c, 1109 and 1110c in those charts represent received observations that contained context data indicating the existence of A or B or a communication activity between both.

Model creation requests 1150, 1151 and 1152 may be performed on this observation data, where each of those model creation requests defines a different observation time period which filters the observation data that should be considered for the model creation by their observation timestamp, and a different time to live period. An observation typically describes a snapshot of a monitoring value at a given point of time, combined with dimensional context data that was observed at this point of time. Therefore, the observation only provides hard evidence for the existence of the context described by the context data at this point of time. A time to live period relaxes this situation by assigning each observation a time period before and/or after the observation timestamp where it can be assumed that the context situation described by the received context monitoring data was also existent. Observation period and time to live period are the only differences of model creation requests 1150, 1151 and 1152.

For model creation request 1150, the to be considered observation time period starts at time point P1 1120 and ends at time point P2 1125. During this time period, only observations 1104a for entity A 1100 are available and therefore used for the creation 1160 of the requested model, consisting only of entity A 1170. The time to live period 1105a provided by request 1150 may be used to identify time periods during the which entity A was considered as present. Applying the time to live period to the measurement data that falls into the observation period reveals that entity A was present from time T1 1121 to time T2 1122 and from time T3 1113 to T4 1124. Descriptive data for model entity 1170 may, in some variant embodiments, contain data describing those time intervals, in other variants it may only contain the total time during which entity A was available, and in still other variants no time to live may be provided and a single observation that indicates the presence of an entity during an observation period may be considered as sufficient evidence to assume the presence of the entity during the whole observation period.

The model creation request 1151 specifies an observation period from P3 1126 to P4 1131, during which observation data for entity A 1104b and entity B 1107b is available. Applying the provided time to live period 1105b and 1108b to those observations provides an existence period from T5 1126 to T8 1130 for entity A and an existence period from T6 1128 to T7 1130 for entity B, which indicates that entity A and entity B coexisted at least during the period from T6 to T7. Execution of the model creation request 1151 creates 1161 a model containing entity A 1171 and entity B 1172 with corresponding detailed existence data.

Model creation request 1152 considers observation time period P5 1132 to P6 1141, during which observation data indicating entity A 1104c, observation data indicating entity B 1107c and observation data indicating communication activities between both entities 1110c is available.

The application of the time to live period provided by the model request to this observation data results in an existence period from T9 1133 to T15 1139 for entity B, and from T10 1134 to T16 1140 for entity A.

Applying the time to live on the observation data 1110c indicating a communication between entity A and B indicates ongoing communication activity between A and B during time the periods from T11 1135 to T12 1136 and from T13 1337 to T14 1138.

A corresponding model is created 1162, which contains entity A 1173 and B 1175 and a communication dependency 1174 between both entities. Entities and communication dependency contain data describing the ascertained existence periods. The also noted direction of the communication dependency may be determined using context dimension data that indicates the roles of involved entities in recorded communication activities, as described earlier.

FIG. 12 conceptually describes a process that may be used for the on-demand creation of a model of a monitored environment by applying model extraction rules on dimensional observation data received from the monitored environment.

The process starts with step 1200, when a model generation request is received, where the received request identifies or contains applicable model mapping or creation rules, an observation time period specifying a time period from which observation data should be considered for the model generation, a time to live value and optional other observation data filters, like data assigned to a specific user of the monitoring system, filters based on the origin of monitoring data and the like. Model mapping or creation rules may be specified in form of entity creation rules 700, structural dependency creation rules 710 or communication dependency rules 900, or other types of dependency creation rules that are specific for a model type.

Following step 1201 may create an empty model space which may be used for the storage of intermediate states of the model that are created during the query execution. Model creation rules may sequentially be evaluated against observation data records and thereby create model updates e.g., in form of new model entities, new dependencies or updates to already existing entities or dependencies. Those updates may be aggregated in the created model space, which step-by-step converges to the desired model.

Following step 1202 selects the next applicable model mapping rule, by following potential rule application sequence requirements. As an example, a rule application requirement may be to apply entity creation rules before dependency creation rules.

Following step 1203 fetches observation data matching the current model mapping rule, like dimensional timeseries records 235 with dimension data 411 that matches the applicability criteria (702, 712 or 902) of the currently processed model mapping rule, that matches the observation time period of the received request e.g., by removing all dimensional timeseries records that do not contain data points 420 for the observation period, and apply other selection and filter criteria received with the model request to select those observation data records on which the currently processed model mapping rule should be applied. Afterwards, step 1204 fetches a first observation record from the observation records selected by step 1205 and following step 1205 applies the currently processed model mapping rule on the selected observation record to create an update for the currently generated model in form of a new or updated entity or dependency as described in FIGS. 5, 6 and 8. Subsequent step 1206 enriches the model space with the model update created by step 1205. Step 1206 may also calculate/update existence data for model elements, based on timing data of observations and the received time to live period, as described in FIG. 11. Step 1206 may e.g., identify time periods in which the delay between two consecutive observation timestamps is below the time to live value to identify continuous existence periods for a model element.

Following decision step 1207 may then determine whether a next observation is available for the currently processed rule. In case a next observation is available, the process continues with step 1204. Otherwise, it proceeds to decision step 1208, which determines whether a next model mapping rule to process is available. If such a rule is available, the process continues with step 1202.

Otherwise, the process continues with step 1209, which may consolidate the created model e.g., by identifying individual model updates that may be combined, or by removing duplicates of model elements or model updates.

Subsequent step 1210 may afterwards provide the model for further usages including analysis, storage, and visualization. The process then ends with step 1211.

An exemplary process that demonstrates an interleaved and iterative model creation and analysis process by the example of an anomaly detection and causality identification process is shown in FIG. 13.

The process starts with step 1300, when model mapping definitions defining rules for the creation of a model out of dimensional monitoring data, a core observation configuration specifying a subset of monitoring data which should continuously be monitored for anomalies and an anomaly detection configuration are available.

Model mapping definitions may be available in form of entity creation rules 700, structural dependency creation rules 710 and communication dependency creation rules 900. A core observation configuration may define monitoring data that describes parameters of a monitored environment that are crucial for the successful operation of the monitored environment, like response times for some core services of a monitored application that are significant for the frictionless operation of the monitored application. Observed degradations of those parameters should immediately be recognized by a monitoring system and root causes for these changes should be identified by the monitoring system in a fast and automated way to support prompt correction of such degradations. In addition, the monitoring system should be capable to ingest and process various formats and types of monitoring data and should not depend on predefined identification data or data formats that are directed to a fixed and also predefined type of topology model. Anomaly detection configuration may define direction and extend of changes of observation data that should be considered as degradations that need to be analyzed. As an example, for service response time monitoring data an increase may be considered as degradation, whereas for a free disk space metric, a decrease may be considered as degradation. Further, extends and levels of changes may be defined to differentiate between expectable statistical fluctuations and significant changes.

Following step 1301 may use the provided core observation configuration and the model mappings to create a core model that only consists in elements that are directly related to the core observations. As an example, if the core observation configuration specifies the response times for a set of services, step 1301 may apply model mapping rules 700 on the observation data that is related to those services and create a model that only contains entities describing those services.

Further, step 1301 may analyze the core observation data to identify anomalies according to the anomaly detection configuration.

Following decision step 1302 continues with step 1303 on a detected anomaly. Otherwise, it returns to step 1301.

Steps 1300 to 1302 implement the continuous analysis of a subset of monitoring data that represent critical functionality of an observed environment for anomalies. In some variant embodiments, this may also be implemented by specifying a subset of timeseries records 235 that describe the operating condition of critical components, like specific services, and then continuously monitoring those timeseries for changes that indicate undesired operating conditions. In case such changes were detected, a core observation model may be created that represents the components on which those undesired operating conditions were observed, and the process may continue with step 1303.

In case of an identified anomaly, subsequent step 1303 may first identify the location of the anomaly in the currently existing core observation model e.g., by analyzing dimension context data of the monitoring data showing the anomaly to determine entity type and identification data and then searching the currently existing core observation model for a matching entity.

Afterwards, step 1303 may extend the core observation model by applying model mapping rules to observation data that is related to the entity on which the anomaly was observed. As an example, step 1303 may first apply dependency creation mapping rules 710 or 900 on observation context data containing identification data for the entity showing the anomaly. Then, it may apply entity creation mapping rues 700 on observation context data describing the opposite end of previously identified dependencies to create corresponding entities in the model. As an example, observation context data may indicate a communication between an anomaly affected service A and service B. A communication dependency mapping rule 900 may be applied on this observation context data to create a communication dependency between services A and B. Afterwards, an entity mapping rule 700 directed to the detection of services may be applied to this observation context data to create a model entity for service B. As discussed before, in some variants the creation of dependency between service A and B and creation of service entity B may also be performed in one step during the application of the dependency creation rule.

After step 1303 is finished and the model is now extended to also contain all direct neighbor entities (i.e., entities that are connected via one dependency) of the entity that is affected by the anomaly, the process continues with step 1304, which performs an anomaly search on those direct neighbor entities to identify anomalies that may have caused the already known anomaly. Direct neighbors of a first entity are those other entities that are directly connected to the first entity by one dependency. As an example, for a given service, all service that are called by the given service are direct neighbors, and the process providing the service is also its direct neighbor. In contrast to direct neighbors, indirect neighbors of a given entity are those entities which are not directly connected with the given entity, but for which a connecting path via at least one intermediate entity and two dependencies exists. An example for an indirect neighbor of a service would be the host computing system on which the process providing the service is running.

Step 1304 may fetch observation data for those new created entities and use the provided anomaly detection configuration to identify abnormal conditions on them. For such new identified abnormal operating conditions step 1304 may further determine whether a causal relationship exists between those new identified abnormal operating conditions and already known abnormal operating conditions. More specifically, step 1304 may search for causal dependencies between new identified abnormal operating conditions and already known abnormal operating conditions that indicate that a new identified abnormal operating condition causes one of the already known abnormal operating conditions.

To determine such causal dependencies, step 1304 may use timing data of identified abnormal operating conditions, communication dependency data and domain-knowledge. Timing data may be used to determine the possible direction of a causal relationship between two abnormal operating condition, as an abnormal operating condition observed at a specific point in time can only be caused by an abnormal operating condition that was observed earlier, but not vice versa.

Call dependencies between services may also be used to determine causal relationships and the direction in which causal effects travel. As an example, a response time degradation observed on a specific service cannot cause response time degradations on other services that are called by the specific service, but it can be the cause of a response time degradation observed on services calling the specific service.

Examples for domain-knowledge based causality determination may use the knowledge that high CPU usage on a process may also cause response time degradations of services provided by the process, because insufficient CPU resources are available to process service requests. However, various factors need to be considered for such a domain-knowledge based causality analysis, because in case in addition to increased CPU usage of a process and response time degradation of services provided by the process, also an increased service load (i.e., increased number of service calls per time unit) is observed for the services of the process, the root cause of the observed undesired conditions may be the increases service load, which causes the process to request more CPU resources from its host computing system to handle those requests. In case the CPU resources of the host computing system get exhausted, the service response time will rise, because less CPU resources are available to process individual service requests.

Following step 1305 performs a recursive search for additional explaining anomalies by stepwise expanding the model by adding direct neighbors of entities on which anomalies were detected that were also identified as cause for already known anomalies and then searching for new explaining anomalies on those new neighbor entities. Step 1305 may continue this recursive search until either no new neighbor entities can be created, or no explaining anomalies can be found on those new neighbor entities.

Following decision step 1306 determines whether the recursive search for explaining anomalies is exhausted and continues with step 1307 in this case.

Step 1307 provides the generated model and the anomaly and causality findings for further processing, visualization, or storage. The process then ends with step 1308.

A notable advantage of the proposed approach is that only the portion of the model is generated/presented to a user that is required for the understanding of the currently analyzed problem or anomaly. This optimizes the usage of storage space, as no unneeded entities/dependencies are created, and it also supports a visualization that is tailored to the problem and its context and does not distract a user from relevant data.

FIG. 14 shows exemplary traversal queries that may be resolved using models that were created according to the demands of received query tasks. Traversal or graph queries contain at least one query term that requires the evaluation of graph connections.

Exemplary query expressions 1440 to 1442 are received, each of those queries contains at least a term that specifies one or more start nodes in a graph, like "FE Services" for query 1440, "BE Service D" for 1441 and "BE services" for query 1442. The queries also contain a traversal term that specifies a traversal along graph dependencies originating from the start nodes, like "communicating with" for query 1440, "usage of" for query 1441 or "called by" for query 1442. In addition, those queries may also contain a condition that defines the end of the traversal like "with Host E" for query 1440 or "called by FE service C" for query 1442. Query 1441 does not contain an explicit traversal end condition, their traversal terms may be followed until they are exhausted i.e., there is no more path in the graph that can be followed. Query tasks in FIGS. 14 and 15 are formulated in prose to not distract the reader from the core concepts with syntactic and structural details. A proposal for a more formal query structure and an exemplary query expression following this structure is shown in FIG. 16.

On receipt of such queries, the monitoring system may select, based on the model entity types required by the queries, and by dependencies that are required by the queries, entity mapping rules 1401 in form of entity creation rules 700 and dependency mapping rules 1402 in form of structural dependency creation rules 710 or communication dependency creation rules 900.

Those mapping rules may then be applied on the dimensional observation data 1400, starting by observation data that is selected according to the starting node terms of the query to create an initial model only containing the starting nodes and afterwards on additional observation data according to the subsequent traversal terms of the query to iteratively create a model according to the requirements of the query.

The analysis of query 1440 may reveal the requirement of mapping rules directed to the creation of service entities, process entities and host entities and mapping rules for the creation of "calling" or "called by" dependencies to follow service call dependencies, for the creation of "provided by" dependencies to traverse from services to processes providing them and of mapping rules to create "running on" to move from processes to the hosts running them. Model generation for query 1440 may then start by selecting observation data for FE services and then applying entity creation rules directed to the creation of service entities on the selected observation data. The observation data selection may in a first step identify observation data describing service executions, and then identify a subset of this data that describe FE (front end) services e.g., by applying a filter based on a service name.

Afterwards, the execution of query 1440 may alternatingly apply dependency mapping rules directed to the creation of communication dependencies of the type "service call", to follow the service call dependencies of FE services and entity mapping rules directed to the creation of services entities to create a model entity for those services.

For created service entities, the query process may apply dependency creation rules directed to the creation of "provided by" structural dependencies and entity creation rules directed to the creation of process entities. For the created processes entities dependency creation rules that create "runs on" dependencies and entity creation rules that create host entities may be applied. This traversal processing will terminate either when no further service call dependency can be identified, or when a service is detected in the dependency chain that is provided by a process that runs on host "E".

The execution of traversal queries 1440 to 1442 may create subsets of the on-demand model 1460. The whole model is only depicted to better explain the executions of those queries.

Query 1440 may start by creating "FE Service A" 1401, "FE Service B" 1406 and "FE Service C" according to its start query term. Then it may create and follow service call dependencies 1416, 1417 and 1418, 1419 and 1420 to reach "BE Service D" 1421, "BE Service E" 1426 and "BE Service F" 1434. For those services, the query may follow structural "provided by" process dependencies and "runs on" host dependencies to reach host "D" 1425 for the traversal started on "FE Service A" and on "FE Service B". As "FE Service B" depends on "BE Service D" and "BE Service E", its traversal has a second arm which reaches host "E" 1230 via "BE Service E" 1426 and "Process E" 1428. Therefore, "FE Service B" is part of the query result set. The traversal starting from "FE Service C" 1411 reaches at host "E" via "BE Service F" 1434 and "Process F" 1432. Therefore also "FE Service C" is part of the result 1450 of query 1440.

Query 1441 may start on "BE Service E" 1426 and then recursively follow service call dependencies until no further call dependencies can be identified, creating a query result 1451 containing "FE Service B" 1406 and "FE Service C" 1411.

Query 1442 may start by creating an entity for "FE Service C" 1411, and then apply communication dependency creation rules and entity creation rules on observation data to detect and create model entities describing the direct service call dependencies of "FE Service C", which leads to a model containing "FE Service C" 1411, service call dependencies 1419 and 1420 and "BE Service E" 1418 and "BE Service F" 1434. The result 1452 of query 1442 contains "BE Service E" 1426 and "BE Service F" 1434.

Other examples for traversal queries that also considers temporal aspects of monitoring data is shown in FIG. 15.

The first traversal query example 1530 may be triggered with an increased response time of a service identified as "Service 1" and the assumption that this increase was caused by a deployment change. Therefore, the goal of query 1530 is to identify deployment changes that occurred at the same time as the observed response time degradation.

Execution of query 1530 may in a first step select an entity creation rule 700 directed to the creation of service entities and apply this rule on monitoring data corresponding to "Service 1", which would lead to the creation of entity 1510 for "Service 1". In addition, it would select timeseries data 1511 describing the change of the response time of "Service 1"' over time and perform a change point analysis of the response time monitoring data to identify change points of the timeseries data. A change point of time series data is a point in time for which the values of the timeseries data are significantly different before and after the point in time. For the response time timeseries 1511 of "Service 1" 1510 a change point would be identified between T10 and T15, as values before T10 are in the range from 40 ms to 60 ms, whereas after T15, the values are in a range from 200 ms to 230 ms. Various statistical analyses of the timeseries values may be performed to detect such change points.

Further, the query execution may select structural dependency creation rules 710 directed to describe the dependencies of services, like "provided by" dependencies, which represent structural dependencies between services and processes that provide those services. Those structural dependencies rules may be applied to dimensional observation data 1500 related to "Service 1", which may reveal structural dependency 1517. Afterwards, the query execution may select entity creation rules directed to the creation of processes and apply it to dimensional monitoring data corresponding to Service 1, which would reveal "Process A" 1521 as the process providing "Service 1" 1510. Further, structural dependency rules 710 and entity dependency rules identifying code libraries and their usage by processes may be applied to dimensional observation data for "Process A", which reveals that "Process A" 1521 uses 1522 a library "Library X" 1523. Further, the query process may fetch timeseries data 1524 describing version changes of "Library X" and analyze this version timeseries data using the previously identified change point of the response time of service "Service 1", which occurred between T10 and T15. This analysis would show that the version of "Library X" 1523 that was used by "Process A" 1521 changed from version V2 to V3 at T13, which coincides with the change point of the response time of "Service 1". Consequently, the result 1540 of query 1530 would be that an upgrade of "Library X" from version V2 to version V3 occurred during the observed response time degradation. Query 1530 only represents one example for a traversal query that searches for deployment changes that correspond with observed changes in measurement data. Other examples may apply the same principles to search for additional or other deployment changes, like changes of operating systems versions or changes of virtualization infrastructure. Those queries only need to identify and follow structural dependencies and then detect deployment changes related to entities along those structural dependency paths that occurred at the same time period as the observed change of measurement values.

Query 1531 is an example for a traversal query that starts with a specific deployment change and then tries to identify behavior changes of a monitored environment, like changes in service response times, which are caused by the deployment change.

Query 1531 may be triggered after an upgrade of "Library X" from version V2 to version V3 to identify the effects of this update.

Execution of query 1531 may start by fetching entity creation rules 700 directed to the creation of library entities and apply these rules on observation data 1500 related to "Library X". The query execution may search for deployment change observation data, like log data indicating library or other software updates containing the name "Library X". Application of these entity creation rules may reveal library entities 1523 and 1527. Corresponding version update timeseries 1524 and 1528 of those library entities reveal that for library instance 1523 the upgrade from version V2 to version V3 was performed at time T12 and for library instance 1527 this upgrade was performed at time T15.

Structural dependency creation rules 710 directed to determine the usage of libraries by processes and entity dependency rules directed to detect process entities may be applied to observation data corresponding to the identified library entities and reveal entities "Process A" 1521 and "Process B" 1525 together with "used by" structural dependencies 1522 and 1526. Structural dependency 1522 indicates that "Process A" 1521 uses instance 1523 of "Library X" and "Process B" 1525 uses instance 1527.

Application of structural dependency creation rules directed to determine "provided by" dependencies between processes and services and entity creation rules to identify services may be applied to dimensional observation data 1500 corresponding to "Process A" and "Process B" and reveal services "Service 1" 1510, "Service 2" 1512, "Service 3" 1514 and "Service 4" 1516 and structural dependencies 1517 to 1520, which indicate that "Service 1" and "Service 2" are provided by "Process A" 1521 and that services "Service 3" and "Service 4" are provided by "Process B". Response time timeseries 1511, 1513, 1515 and 1517 for those services may be fetched by the query execution and a change point analysis may be performed on those timeseries.

This analysis may identify a change point on timeseries 1511 between T10 and T15, which occurred on the same time as the update of "Library X" instance 1523 from version V2 to version V3. As "Library X" instance 1523 is used by "Process A", which provides "Service 1" 1510 and timeseries 1511 describes the response time of "Service 1", it can be assumed that "Service 1" is affected by the upgrade of "Library X" from version V2 to version V3.

The change point analysis may also identify a change point on timeseries 1517 between T10 and T15. Timeseries 1517 describes the response time of "Service 4", which is provided 1520 by process 1525, which uses 1526 an instance of "Library X" which was upgraded form version V2 to V3 at time T15. Therefore, it can also be assumed that "Service 4" is affected by the upgrade of "Library X".

Also, response time timeseries data 1513 and 1515 from "Service 2" 1512 and "Service 3" 1514 may be analyzed, but this analysis may reveal no change point.

Consequently, the result 1541 of query 1531 indicates that "Service 1" 1510 and "Service 4" 1516 are affected by the library update.

Coming now to FIG. 16, which illustrates format and structure of traversal queries that operate on on-demand models on a monitored environment, in form of a proposed data structure for such queries 1600 and an example query 1650 following this structure.

A traversal query data structure 1600 may contain but is not limited to a source entity selector term 1610, which contains rules and filters that may be used to create a model that contains only the entities which form the origin of the traversal part of the query, a traversal term 1620 which may contain a list of traversal steps 1621, each traversal step 1621 defining rules and filters that expand the on-demand model with additional entities and dependencies to support traversal step and instructions to perform the traversal steps in the expanded model, and an optional target entity selector term 1630, which may be used to select a subset of the entities that were identified by the traversal.

A source entity selector term 1610 may contain but is not limited to a filter type 1612, which may be one of entity type, dimension key and/or value, temporal filter, or subquery-based filter and filter type specific filter parameter 1613. A filter of type node or entity type may be used to define entities by their type, like "process", "service" or "host". Type based filters may be used to select corresponding entity creation rules 700 that are directed to the creation of the desired entity type. Filters of type dimension key and/or value or metric value may be used to filter observation data based on its context dimension and metric data and temporal filter may be used to filter observation data based on the presence of observation data points during specified time intervals. Filters of type sub query may be based on the result of other, nested traversal queries 1600.

A traversal step 1621 may contain but is not limited to an optional step origin entity filter 1622, which may contain one or more entity filter entries 1611 that may be applied on the entry entities of the traversal step, which may have been created by the evaluation of either a source entity selector term 1610 or a previous traversal step 1621, a dependency traversal instruction 1632, which specifies an expansion of the on-demand model to support the traversal step and instructions to perform the traversal step on the expanded on-demand model, and an optional step target selector 1627 containing one or more entity filter entries 1611 to filter the result entities of the traversal step.

Dependency traversal instructions 1623 may contain but are not limited to an optional dependency type filter 1624, which may be used to select the dependency creation rules 710 or 900 that are used for the creation of dependencies and entities that are required by the traversal step, a traversal direction 1625 specifying whether traversal direction is with or against the dependency direction and a traversal limitation 1626 which defines the numbers of dependencies that the traversal step covers. Dependencies are typically directed, as examples "calls" communication dependencies between services are directed from a calling service to a called service or "runs on" dependencies between a process and a host computing system are directed from a process to a host. The traversal direction 1625 specifies for a traversal step whether dependencies should be followed in or against their direction.

A single traversal step may contain more than one dependency step, as an example a traversal step may specify to start at a specific service and then follow "calls" dependencies against dependency direction to reach all services that have a direct or indirect call dependency on the specific service. This traversal step may in theory traverse through an infinite set of calling services and "call" dependencies. To limit such types of traversals, a traversal limit 1626 e.g., in form of a "hop count" may be used. Such a hop count specifies the maximum number dependencies that such a traversal step may follow.

A target entity selector term 1630 may contain one or more entity filter entries 1611 to filter the entities that were created and selected by the source entity selector term and the traversal steps of the query.

Query 1650 is a formal notation of query 1440 on FIG. 14, which follows the structure defined in 1600.

A source entry selector term 1610*a* specifies that entities of type "host" are required, which in turn specifies the entity type creation rules 700 that are required for the creation of the initial model for the query. It further specifies that hosts with a host name "E" should be created, which may be used to filter the dimensional observation data that is applied to the selected entity creation rules.

A first traversal step 1621*a* specifies that "runs on" dependencies should be followed, which may be used to select corresponding structural dependency creation rules 710. Dependencies that origin from the host entity identified by the source entity selector term should be identified, which may be used to select the observation data which is applied to the selected dependency creation rules to create the required dependencies. The evaluation of those rules on the selected observation data may also create entities representing the processes running on host "E". Traversal direction of traversal step 1621 specifies that created dependencies should be traversed against their dependency direction, which means from host to processes running on the host, its step target selector term specifies that only "runs on" dependencies originating on processes are followed and its traversal limitation is 1, indicating that only one dependency is followed from host to process.

Traversal step 1621*b* specifies the traversal step from processes to service and starts with all process entities produced by traversal step 1612a. The dependency type filter specifies "provided by" structural dependencies, which may be used to select corresponding structural dependency creation rules 710 and identification data for the process entities created by traversal step 1621a may be used to filter the observation data on which the rules are evaluated to create the required "provided by" structural dependencies entities for the services that are provided by the processes identified by traversal step 1621a.

The result of traversal step 1621b are all services that are provided by all processes that run on host "E".

The next traversal step 1621c starts by the services identified by step 1621b and recursively identifies and follows "calls" communication dependencies until all services that directly or indirectly call a service that is provided by a process running on host "E" are reached. The traversal limitation "HOPS=*" indicates that an unlimited hop count is followed by the traversal step, which only ends when no further calling services can be found.

The final target entity selector term 1630 may then filter the set of services provided by traversal step 1621c and only select those services with a service name "FE" and provide those services as result of the query.

Coming now to FIG. 17, which provides the flow chart of a process that may be used for the execution of traversal queries on on-demand models.

The process starts with step 1700, when a new traversal query, structured as described in FIG. 16, is received. Following step 1701 may process the source entity selection term 1610 of the received query, by selecting entity creation rules 700 according to entity type based filter entries 1611 and selecting and filtering dimensional monitoring data according to key and or value based, metric value based or time period based filter entries 1611. Afterwards, step 1701 may apply the selected entry creation rules on the filtered dimensional monitoring data to create model entities of the types specified by the selected entity creation rules, where the instances of the created model entities are defined by the selected dimensional monitoring data. The created entities represent a fragment of a model of the monitored environment that is required to execute the query. This model fragment may be created for the query execution and may also grow during the query execution.

Following decision step 1702 analyzes the received query to determine whether a next traversal step 1621 is available. In case a next traversal step is available, the process continues with step 1703, otherwise, step 1710 is executed, which evaluates the target entity selection term 1630 of the query 1600. Some queries may only contain a source entity selector term and no traversal term. In such cases, the process may proceed from step 1701 via step 1702 directly to step 1710.

If a traversal step to process is available, step 1703 is executed which applies an origin filter 1622 if it is available. The evaluation of a source entity selection term, or a previously executed traversal step may have created a model fragment containing a set of entities. The origin filter may select a subset of those entities based on their properties.

Subsequent 1704 may then select dependency creation rules 710 or 900 according to a provided dependency type filter 1624. A dependency type filter may specify types of dependencies that the traversal step is about to follow, and the specified dependency types may be used select dependency creation rules 710 or 900 that create dependencies of those types. In case no dependency type filter is provided, all available dependency creation rules may be selected.

Following step 1705 may then select the dimensional observation data that is required by for the traversal step by selecting dimensional observation data that corresponds to the filtered origin entities. As an example, step 1705 may select dimensional observation data containing data that matches type or identity definition data of those origin entities. Step 1705 may then apply the selected dependency creation rules 710 or 900 on the selected dimensional observation data to create candidate dependencies that are required to execute the traversal step.

Following step 1706 may then apply traversal direction 1625 and step target selector restrictions 1627 to select the dependencies that are relevant for the traversal step based on the direction of the dependencies and on properties of the entities that those dependencies connect with origin entities of the traversal step.

Dependencies between entities typically describe a directed relationship between those entities, like call dependencies between services describe which services are called by which other services, and as there is typically a calling service and a called service, such dependencies are typically asymmetric and have a direction component. Step origin filter of a traversal step 1622 specify one entity that is part of a dependency and dependency type filters 1624 specify a type of dependency that should be followed, but those filters are not capable to define a traversal direction on such a dependency. As an example, a step origin filter may specify a specific service entity and a dependency type filter may specify "calls" dependencies. Applying filtered dependency creation rules 900 on dimensional observation data that is related to the service entity would create both dependencies describing calls of the specific service entity by other services and calls performed by the specific service to call other services as candidate dependencies. The traversal direction 1625 may be used to select either dependencies describing calls of the specific service or calls by the specific service. With a step target selector, traversed dependencies may be selected according to the type or other properties of the entity they are connecting to. As an example, dependency type filter and traversal direction may specify that "calls" dependencies of services contained in the origin entities are followed against their direction (from called service to calling service). In such a case, the step target selector 1627 may in addition filter those calling services based on the name of those services, this way further reducing the dependency paths the traversal step follows.

Subsequent step 1707 may fetch entity creation rules 700 to create the new entities to which the dependency traversal step led. Step target selector data 1627 specify the type of entities to which the traversal step should direct. This entity type data may be used to select appropriate entity creation rules 700. Dimensional monitoring data that corresponds to the filtered dependencies of the traversal step (as determined by step 1706) may be fetched and the selected entity creation rules may be applied on the fetched dimensional monitoring data to create the required target entities.

Following step 1708 may then update the query model fragment with the dependencies selected by step 1706 and the entities created by step 1708.

Afterwards, decision step 1709 checks whether application of the traversal step created an update of the query model fragment and if the traversal limit 1626 of the traversal step is not reached. If both conditions apply, the process continues with step 1703 and applies the current traversal step again on the updated query model fragment. An update caused by the current traversal step execution indicates that the traversal step is not exhausted, and a subsequent execution of the traversal step may result in another model update. As an example, a traversal step may specify the traversal from a service to the service that is calling the service. If the current execution of the traversal service identified a new ancestor service in the service call chain, it makes sense to apply the traversal step another time on the update model with the new calling service. If the current execution did not find a new calling service and did therefore not change the model fragment, a subsequent execution of the traversal step will also not create an update. Consequently, subsequent executions of this step can be omitted.

A not reached traversal limit for the traversal step indicates that a subsequent execution of the traversal step is desired by the designer of the query. Staying with the service call example, a query designer may only be interested in two ancestor service calls in the service call chain. If the desired service calls were identified, the query execution can proceed to the next traversal step 1621 or the target entity selector 1630.

If either of one of the conditions of step 1709 does not apply, the process continues with step 1702 to select the next traversal step.

In case no next traversal step is available, the process continues with step 1710, which applies the target entity selection term 1630 on the entities of the query model fragment. The target entity selection term may select entities based on their types or other features. In addition, the target entity selection term may also contain filter criteria that are based on the traversal step in which entities were created. As an example, such a filter criterion may specify that only entities created by the execution of the last traversal step should be considered for the execution of the target entity selection term 1630.

Following step 1711 may then provide the query result, ether in form of the entities selected by step 1710, or in form of a combination of those selected entities and the created model fragment for further analysis, visualization, and storage.

The process then ends with step 1712.

Coming now to FIG. 18, which conceptually describes a search index to for vertical relationships between entities described by dimension sets together with a process that may be used to create or update such a search data structure on new received dimension sets.

A rule-based determination of relationships between model entities, as proposed above, has the advantage of full control over the created relationships. In addition, such a determination system is fully deterministic and explainable. For a given set of observation data and a rule set, it is fully explainable and transparent which relationships are created.

However, those advantages come at a price, as the creation and maintenance of such rule sets requires considerable manual work of domain experts. Vendors of monitoring systems may provide generic, out-of-the-box rule sets, which may be adapted by domain experts of specific applications to the monitoring needs of those applications. Although such predefined, adaptable rule sets provide some help during an initial, setup phase of a monitoring system, they do not significantly reduce the required manual configuration work.

To overcome these shortcomings, a data driven approach for the detection of dependencies for a generated model is proposed. In principle, such a data drive approach may analyze the occurrence of individual dimension values in observed dimension sets to determine and quantify an overlap of dimension sets that contain different dimension values. The quantified overlap score may then be use for an automated identification of relationships between those different dimension values. If those dimension values are also identifiers for entities in a created domain model, the identified relationships between dimension values may also be used to create relationships in the domain model. The dimension set data that is used by this approach may be extracted from various types and forms of monitoring data that may extracted from a monitored environment. Sources of this data include log files generated by components of a monitored environment, like processes, operating systems, virtualization systems or the like, transaction tracing and other execution or resource usage data that may be provided by agents deployed to a monitored environment, or it may be retrieved from monitoring APIs provided by components of a monitored environment like SNMP, WMI or JMX services.

An architecture 1800 of a relationship search index 108 for relationships between dimension sets based on the occurrence of dimension values in dimension sets may receive dimension sets 411, which are used to update or create 1810 index entries 1805 of the search index 1801. In addition, received dimension sets 411 may also be used to update a nearest neighbor search data structure 1802, which may be used for the fast location of dimension values pairs with a high overlap of dimension sets in which they are contained. LSH Ensemble (published 2016 by E. Zhu, et al. 2016 in Proceedings of the VLDB Endowment Vol. 9) proposed sublinear search data structure for the fast detection of overlapping sets. An LSH Ensemble implementation may be used as nearest neighbor search data structure 1802. Such a nearest neighbor search data structure may support both directed searches for relationship, where at least one dimension value is provided and relationships for this dimension value are provided, and undirected searches, where all relationships that are indicated by a given dimensional observation set are requested.

Elements 1808 of the data identifier set 1807 of an index entry 1805 represent a dimension set that contain the dimension value represented by the index entry. Therefore, a high overlap of data identifier sets for two dimension values may be use as an indication that the two dimension values are related.

In the ideal case, the data identifier set of a first dimension value is completely included in the data identifier set of a second dimension value, which would indicate that the first dimension value represents the "child" element of the relationship and the second dimension value represents the "parent" element. As more concrete example, the "child" dimension element may specify the name of a process and the "parent" dimension may specify the name of a host computing system executing the process. The dimension element representing the process may be contained in a first set of dimension sets represented by a first data identifier set and the dimension element representing the host dimension element may be contained in a second set of dimension sets represented by a second data identifier set. If the first data identifier set for the process is completely included in the second data identifier set for the host, this indicates that the process is running on the host and that a directed parent/child relationship between the process having the child role and the host having the parent role exists.

The relationship search index 1801 may contain a set of index entries 1805, where each index entry may contain but is not limited to a dimension value entry 412, containing a dimension key 413 and a dimension value 414, and a data identifier set 1807 containing multiple data identifiers 1808 which identify the dimension sets in which the dimension value specified by the dimension value entry 412 is contained. Instead of containing the original set of data identifiers 1808, the data identifier set 1807 may contain a sketching data structure like a MinHash, SuperMinHash, HyperLogLog, SimHash or SetSketch record representing the data identifier set. Requirements for the used sketching data structure include the possibility to calculate/estimate the cardinality of the described set and to calculate/estimate the cardinality of the intersection of two sets described by two sketching data structures. An index entry 1805 of a relationship search index 1801 relates a specific dimension value entry 412 having a concrete dimension key 413 and a concrete dimension value 414, with the dimension sets 411 containing this concrete dimension value entry 412.

The search index 1801 may be updated 1810 on receipt of new dimension sets 411, containing multiple dimension value entries 412. An index entry 1805 may be created for each dimension value entry of the received dimension set and a data identifier may be calculated for the set of dimension values contained in the received dimension set, e.g., in form of a hash value that is calculated for the dimension value set. The calculated data identifier 1808 may then be added to the date identifier set of all index entries that match a dimension value entry 412 of the received dimension set 411. More concrete, if a received dimension set contains the dimension values "A" and "B" an index entry may be created for "A" and "B", and a hash value may be calculated for the dimension value set containing "A" and "B". The hash value may be used as data identifier for the dimension set "A" and "B". This data identifier may then be added to the data identifier sets of the index entries created for dimension value "A" and "B".

In addition, also the optional nearest neighbor search data structure 1802 may be updated 1809 on receipt of a new dimension set 411.

The relationship search index 1801 may receive relationship search requests 1803 at least containing a probability threshold. Those requests may either be processed using the nearest neighbor search data structure 1802, which may access and fetch 1806 index entries to resolve the requests, or, in absence of a nearest neighbor search data structure, the index entries 1805 themselves may be analyzed to identify those index entries that match the received request.

Coming now to process 1820, which exemplary described the processing of received dimension sets to create and maintain a relationship search index.

A response 1804 containing a search result describing identified relationships that match the provided probability threshold may be returned for received search requests 1803.

The processing 1820 of received dimension sets 411 to update the search index 1801 starts with step 1821, when a new dimension set 411 is received.

Following optional step 1822 may remove dimension values that are not required for relationship determination. Removed dimension values may include those dimension values that only describe but not identify an entity. As an example, dimension data describing the operating system or the version of this operating system that is executed on a host computing device may be removed as they describe the host computing system, whereas network name and/or network address of the host computing system, which may also be used to identify it, may not be removed in step 1822.

Subsequent step 1823 may then calculate a data identifier for the received dimension set, e.g., by deriving a hash value for the keys 413 and values 414 contained in the dimension value records 412 of the received dimension set.

Afterwards, step 1824 may for each received dimension value record 412 query the search index 1801 for a corresponding (matching dimension key 413 and dimension value 414) index entry 1805. If a matching index entry is found, step 1824 may add the calculated data identifier to the data identifier set 1807 of the found index entry. If no matching index entry is found, a new one may be created using key 413 and value 414 of the dimension value record, the data identifier may be added to the data identifier set 1807 of the new crated index entry and the index entry may be inserted into the relationship search index 1801.

Adding the data identifier to the data identifier set may either be performed by adding the data identifier to a data structure representing the original set, or by updating a sketching data structure representing some features of the original set, like its cardinality or similarity to other sets.

Optional step 1825 may then update the nearest neighbor search data structure 1802 to also represent the index entries that were created or updated for the received dimension set.

The process then ends with step 1826.

Process 1820 incrementally creates and maintains a mapping index which maps individual dimension values to a set representation of the dimension sets containing these individual dimension values.

Referring now to FIG. 19, which provides variants of processes that use the relation search index data structure 1801 to detect relationships between dimension values. The processes search for "strong aggregation" relationships, where one of the related elements represents a containing element and the other related element represents a contained element and where the containment is exclusive, which means if one element is contained in one other element, it cannot be, at the same time, be contained in another element.

A first relationship determination process 1900 is directed to determine whether a relationship is indicated between two candidate dimension values where one of the dimension values may be the assumed child dimension value and the other one the assumed parent dimension value. The received parent and child dimension value may be in structured form, allowing to distinguish between dimension key and concrete dimension value.

The process starts with step 1901 when a candidate parent and child dimension value and an optional threshold value are received. Following step 1902 may then fetch index entries 1805 for the two received dimension values from the relationship search index 1801. Step 1902 may select those index entries 1805 with key 413 and value 414 matching the received dimension value.

Following step 1903 may then calculate or estimate the cardinality of the data identifier set for the child dimension value. If raw data identifiers 1808 are stored in the data identifier set 1807, step 1903 may simply count the number of stored data identifiers. If a sketching data structure describing the data identifier set is stored, step 1807 may evaluate the sketching data structure to calculate an estimate for the cardinality.

The cardinality of the intersection of the data identifier sets 1807 for parent and child candidate dimension values may then be calculated in step 1904. In case the raw data identifiers are stored in the data identifier sets 1807, step 1904 may simply count the number of data identifiers 1808 that occur in both data identifier sets. If sketching data structures are stored, step 1904 may evaluate those sketching data structures to calculate an estimate for the intersection cardinality.

Afterwards, step 1905 may then calculate an overlap score quantifying the overlap of the data identifier set of the child dimension value with the data identifier set for the parent dimension value, by dividing the intersection cardinality by the child cardinality.

Subsequent decision step 1906 may then compare the calculated overlap score with an optional threshold, where the threshold may be in the value range from about 0.7 to 0.99. The threshold may be used to compensate inconsistent or incomplete observation data for which a complete overlap is not likely. If a threshold is omitted, e.g., for cases where it can be guaranteed that the observation data is complete and consistent, step 1906 may compare the overlap score with the value 1.0.

If the overlap score is higher than the threshold, or if no threshold was provided, if the overlap score equals 1.0, the process continues with step 1907, which indicates the existence of a parent/child relationship between the received parent and child dimension value. Otherwise, step 1908 is executed which indicates that no relationship exists.

After step 1907 or 1908, the process ends with step 1909.

Another variant of a process 1910 to determine the existence of relationships receives a candidate parent dimeson and determines a set of other dimensions that are in a parent/child relationship with the provided parent dimension.

The process starts with step 1911, when a candidate parent dimension value and an optional threshold are received and continues with step 1912, in which child dimension values for the received candidate parent dimension are identified. Step 1912 may first select the index entry 1805 representing the received parent dimension value. Afterwards, it may select all other entries 1805 of the index 1801 and determine or calculate an estimate for the cardinality of the data identifier set of each selected entry, and the cardinality of the intersection of the data identifier set of the parent dimension entry and the data identifier set of each selected entry.

Step 1912 may also calculate for each selected other entry an overlap score by dividing its intersection cardinality by its data identifier set cardinality. Step 1912 may then compare each calculated overlap score with the optionally received threshold and select all index entries for which the overlap score is above the threshold. In case no threshold value is available, step 1912 may select all index entries for which the calculated overlap score has the value 1.0. As the computational complexity of the processing performed by step 1912 is at least linear, because it increases proportional with each added index entry, step 1912 may instead use the nearest neighbor search data structure 1802 to identify index entries representing child dimension values more efficiently.

Following step 1913 may then provide the dimension values of the identified index entries as child dimension values for the received parent dimension value. The process then ends with step 1914.

Still another process variant 1920 may process requests to determine all parent/child relationships for data stored in a relationship search index 1801. The process starts with step 1921, when a request to calculate all parent/child relationships, together with an optional threshold value is received.

Following step 1922 may then determine the existence of a parent/child relationship for each combination of two index entries 1805 form the relationship search index 1801, by determining or estimating individual data identifier set cardinalities and intersection cardinalities to calculate an overlap score for the index entry combinations and then select those index entry combination for which the overlap score value is 1.0, if no threshold was provided, or above the provided threshold. The computational complexity of step 1922 is even worse than the complexity of step 1912, as it is at least quadratic. Therefore, step 1922 may also use the nearest neighbor search data structure 1802 to find relationships more efficiently.

Step 1922 may in addition determine the parent and child role for each index entry combination for which a relationship was detected. The index entry 1805 which was only used to determine the intersection cardinality for the overlap score may be indicated as parent index entry and the index entry which was used to determine both the intersection cardinality and the separate data identifier set cardinality for the overlap score may be indicated as child entry.

Following step 1923 may then provide the dimension values of the index entry pairs determined by step 1922 as candidates for parent/child relationship. Step 1923 may also provide for each dimension value the parent/child role determined by step 1922.

The process then ends with step 1924.

The outcomes of processes 1900, 1910 and 1920 may be used in various ways. Usages include but are not limited to automated updates of a topology model with identified relationships, grouping topology elements according to identified relationships, or providing a user a list of identified relationship candidates for manual analysis to identify plausible relationships, potentially followed by a manual update of a topology model.

For an automated update of a topology model with an identified relationship, identifying dimension value data, e.g., in form of key-value pairs may first be extracted from two entities of the topology model. Examples for such identifying data include but are not limited to the name, network address or other identifier for a host computing system, or a command line for a process. After the identifying key-value data is extracted, the relationship search index 1802 may be used to determine an overlap score for the two key-value pairs. In case the overlap score indicates the existence of a relationship between the two key-value pairs, the topology model may be updated with a relationship between the two entities that are identified by the key-value pairs.

To group entities according to a specific feature, first a dimension value for the desired grouping needs to be designed. As an example, processes executing a specific type of application server may be sought, therefore a dimension value identifying this application server type needs to be specified. Afterwards, the relationship search index may be used to identify other dimension values that have an overlap score with the dimension value identifying the desired grouping that indicates the existence of a relationship. The so identified related dimension values may afterwards be analyzed to identify and filter those dimension values that identify entities that represent processes. The filtered entities may then be reported as members of the group.

To provide a list of all relationship candidates for a topology model, the relationship search index may be used to identify those pairs of dimension values for which an overlap score exists that indicates a relationship. A nearest neighbor search structure included in the relationship search index may be used to speed up this search. The so identified pairs of dimension values may then be filtered to remove those pairs of dimension values for which at least one dimension value does not identify an entity of the topology model. The remaining dimension value pairs may then either be used for an automated update of the topology model with new identified relationships, or the dimension value pairs may be sorted descending according to their overlap score. The sorted list may then be presented to a user/maintainer of the topology model, which may then use the list to manually update the topology model with selected identified relationships.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring performance in a distributed computing environment, comprising:

receiving, by a data ingestion module, an instance of performance monitoring data;

extracting, by the data ingestion module, a performance metric from the instance of performance monitoring data in accordance with data ingestion rules, where the performance metric includes a value for the performance metric and a timestamp at which the performance metric was observed and a metric type for the performance metric;

extracting, by the data ingestion module, context dimension data from the instance of performance monitoring data in accordance with the data ingestion rules, where the context dimension data identifies a given computing entity to which the performance metric pertains to and includes a key that identifies a specific context dimension and a value for the specific context dimension;

creating, by the data ingestion module, a datapoint using the performance metric and the context dimension data, where the datapoint includes the value for the performance metric, the timestamp at which the performance metric was observed, the metric type for the performance metric and the context dimension data;

storing, by the data ingestion module, the datapoint in a data store;

receiving, by a model extraction module, a model generation request, where the model generation request identifies or contains model update rules;

retrieving, by the model extraction module, datapoints from the data store in accordance with the model generation request;

generating, by the model extraction module, a model element for a topology model based on the retrieved datapoints and the model update rules, where context dimension data in the retrieved data points matches an applicability criteria defined by the model update rules, and the topology model represents at least a portion of the distributed computing environment and defines relationships between computing entities in the distributed computing environment;
updating, by the model extraction module, the topology model with the model element; and
analyzing, by an analysis module, datapoints in the data store using the updated topology model.

2. The method of claim 1 further comprises capturing the performance monitoring data by an agent instrumented into a computing entity in the distributed computing environment.

3. The method of claim 1 further comprises extracting a second performance metric from the instance of performance monitoring data, where the second performance metric differs from the performance metric.

4. The method of claim 1 further comprises
receiving, by the data ingestion module, multiple instances of performance monitoring data;
extracting, by the data ingestion module, one or more performance metrics from each instance of the multiple instances of performance monitoring data in accordance with data ingestion rules; and
storing, by the data ingestion module, a subset of datapoints from the one or more performance metrics in the data store as a timeseries, where datapoints in the subset of datapoints have matching metric types and matching context dimension data.

5. The method of claim 1 wherein the model generation request specifies at least one of a time range in which performance metrics were observed and values for context dimension data of interest, such that the datapoints are retrieved from the datastore using the at least one of the time range in which performance metrics were observed and the values for context dimension data of interest.

6. The method of claim 1 wherein generating a model element for a topology model based on the retrieved datapoints and the model update rules further comprises one of creating a structural entity in the topology model or creating a relationship between two structural entities in the topology model.

7. The method of claim 1 wherein the model update rules are comprised of a series of rules, such that each rule in the series of rules can be applied in parallel to the datapoints in the data store.

8. The method of claim 1 wherein the model generation request specifies an observation period in which performance metrics were observed and further comprises
retrieving datapoints from the data store that fall within the observation period, where the retrieved datapoints pertain to a particular computing entity;
creating a structural entity in the topology model for the particular computing entity; and
assigning an existence period to the particular computing entity based on timestamps from the retrieved datapoints, where the existence period indicates presence of the particular computing entity in the distributed computing environment.

9. The method of claim 1 wherein the model generation request specifies an observation period in which performance metrics were observed and further comprises
retrieving datapoints from the data store that fall within the observation period, where the retrieved datapoints pertain to a particular relationship between computing entities;
creating a relationship in the topology model for the particular relationship; and
assigning an existence period to the relationship based on timestamps from the retrieved datapoints, where the existence period indicates presence of the particular relationship between computing entities in the distributed computing environment.

10. The method of claim 1 wherein analyzing datapoints in the data store using the updated topology model further comprises
a) analyzing, by an analysis module, datapoints in the data store to identify a particular anomaly in a given performance metric;
b) determining, by an analysis module, a given computing entity in the distributed computing environment upon which the particular anomaly was observed;
c) creating, by an analysis module, a node for the given computing entity in a topology model in accordance with the model update rules, where the topology model represents at least a portion of the distributed computing environment and defines relationships between computing entities in the distributed computing environment;
d) identifying, by an analysis module, additional computing entities having a relationship with the given computing entity; and
e) for each additional computing entity, updating, by an analysis module, the topology model in accordance with the model update rules;
f) for each additional computing entity, searching in the topology model for one or anomalies that may have caused the particular anomaly;
g) for each of the one or more anomalies, analyzing a newly detected anomaly to determine a causal relationship with the particular anomaly; and
for each newly detected anomaly having a causal relationship with the particular anomaly, recursively performing steps c) through h).

11. A system for monitoring performance in a distributed computing environment, comprising:
a data ingestion module configured to receive an instance of performance monitoring data, extract a performance metric from the instance of performance monitoring data in accordance with data ingestion rules and extract context dimension data from the instance of performance monitoring data in accordance with the data ingestion rules, where the performance metric includes a value for the performance metric and a timestamp at which the performance metric was observed and a metric type for the performance metric and the context dimension data identifies a given computing entity to which the performance metric pertains to and includes a key that identifies a specific context dimension and a value for the specific context dimension;
wherein the date ingestion module operates to create a datapoint using the performance metric and the context dimension data, and store the data point in a data store, where the datapoint includes the value for the performance metric, the timestamp at which the performance metric was observed, the metric type for the performance metric and the context dimension data;
a model extraction module configured to receive a model generation request and retrieve datapoints from the data store in accordance with the model generation request, where the model generation request identifies or contains model update rules;
wherein the model extraction module generates a model element for a topology model based on the retrieved datapoints and the model update rules, and updates the topology model with the model element, where context dimension data in the retrieved data points matches an applicability criteria defined by the model update rules, and the topology model represents at least a portion of the distributed computing environment and defines relationships between computing entities in the distributed computing environment; and an analysis module analyzes the datapoints in the data store using the updated topology model, where the data ingestion module, the model extraction module and the analysis module are implemented by computer executable instructions executed by one or more computer processors.

12. A computer-implemented method for monitoring performance in a distributed computing environment, comprising:
  a) storing datapoints in a data store, where each datapoint includes a value for a performance metric related to a given computing entity in the distributed computing environment, a timestamp at which the performance metric was observed, and a metric type for the performance metric;
  b) analyzing, by an analysis module, datapoints in the data store to identify a particular anomaly in a given performance metric;
  c) determining, by an analysis module, a given computing entity in the distributed computing environment upon which the particular anomaly was observed;
  d) creating, by an analysis module, a node for the given computing entity in a topology model in accordance with the model update rules, where the topology model represents at least a portion of the distributed computing environment and defines relationships between computing entities in the distributed computing environment;
  e) identifying, by an analysis module, additional computing entities having a relationship with the given computing entity; and
  f) for each additional computing entity, updating, by an analysis module, the topology model in accordance with the model update rules.

13. The method of claim 12 further comprises
receiving, by a data ingestion module, multiple instances of performance monitoring data;
extracting, by the data ingestion module, a performance metric from each instance of performance monitoring data in accordance with data ingestion rules, where the performance metric includes a value for the performance metric and a timestamp at which the performance metric was observed and a metric type for the performance metric;
extracting, by the data ingestion module, context dimension data from each instance of performance monitoring data in accordance with the data ingestion rules, where the context dimension data identifies a given computing entity to which the performance metric pertains to and includes a key that identifies a specific context dimension and a value for the specific context dimension;
creating, by the data ingestion module, a datapoint using the performance metric and the context dimension data, where the datapoint includes the value for the performance metric, the timestamp at which the performance metric was observed, the metric type for the performance metric and the context dimension data; and
storing, by the data ingestion module, the datapoint in a data store.

14. The method of claim 12 further comprises storing datapoints for the given performance metric as a time series and identifying a particular anomaly in the given performance metric when a change occurs in the time series for the given performance metric.

15. The method of claim 13 further comprises determining a given computing entity in the distributed computing environment upon which the particular anomaly was observed from context dimensional data of datapoints associated with the given performance metric.

16. The method of claim 15 wherein creating a node for the given computing entity in a topology model further comprises one of creating a structural entity in the topology model or creating a relationship between two structural entities in the topology model.

17. The method of claim 16 further comprises identifying additional computing entities having a relationship with the given computing entity by applying dependence creation rules to the context dimensional data of datapoints associated with the given performance metric.

18. The method of claim 12 further comprises
  g) for each additional computing entity, searching in the topology model for one or anomalies that may have caused the particular anomaly;
  h) for each of the one or more anomalies, analyzing a newly detected anomaly to determine a causal relationship with the particular anomaly; and
  for each newly detected anomaly having a causal relationship with the particular anomaly, recursively performing steps c) through h).

19. A system for monitoring performance in a distributed computing environment, comprising:
  a data store for storing datapoints, where each datapoint includes a value for a performance metric related to a given computing entity in the distributed computing environment, a timestamp at which the performance metric was observed, and a metric type for the performance metric; and
  an analysis module configured to analyze datapoints in the data store to identify a particular anomaly in a given performance metric and determine a given computing entity in the distributed computing environment upon which the particular anomaly was observed;
  wherein the analysis module operates to create a node for the given computing entity in a topology model in accordance with the model update rules, identify additional computing entities having a relationship with the given computing entity, and for each additional computing entity, update the topology model in accordance with the model update rules where the topology model represents at least a portion of the distributed computing environment and defines relationships between computing entities in the distributed computing environment.

20. An automated method for identifying relationships between data observed in a distributed computing environment, comprising:
  receiving observation data for computer transactions executed in the distributed computing environment;
  for each instance of the observation data, extracting one or more key-value pairs from a given instance of observation data and thereby form a dimension set of key-value pairs for the given instance of observation data, where each key-value pair includes a key that identifies type of datum type and a value for the datum, and a plurality of dimension sets are derived from the observation data;

for each dimension set, determining a set identifier for a given dimension set, where the set identifier is calculated from types and values of datum in the key-value pairs comprising the given dimension set;

for each key-value pair in each dimension set, updating an entry in a search index, where the search index includes an entry for each unique key-value pair and each entry stores set identifiers for the corresponding key-value pair;

receiving a first key-value pair of interest;

receiving a second key-value pair of interest;

determining cardinality of dimension sets containing value of datum in the first key-value pair;

determining cardinality of an intersection of dimension sets containing value of datum in the first key-value pair and dimension sets containing value of datum in the second key-value pair; and calculating an overlap score by dividing the cardinality of the intersection by the cardinality of the dimension sets containing value of datum in the first key-value, wherein the overlap score is indicative of a relationship between the first key-value pair of interest and the second key-value pair of interest.

21. The automated method of claim 20 further comprises capturing the observation data by an agent instrumented into a computing entity in the distributed computing environment.

22. The automated method of claim 20 further comprises comparing the overlap score to threshold and determining a type of relationship between the first key-value pair of interest and the second key-value pair of interest from the comparison.

\* \* \* \* \*